US011979448B1

(12) United States Patent
Bakshi

(10) Patent No.: US 11,979,448 B1
(45) Date of Patent: May 7, 2024

(54) SYSTEMS AND METHODS FOR CREATING INTERACTIVE SHARED PLAYGROUNDS

(71) Applicant: Shared Space Studios Inc., Brooklyn, NY (US)

(72) Inventor: Amar Chopra Bakshi, Bethesda, MD (US)

(73) Assignee: Shared Space Studios Inc., Brooklyn, NY (US)

( * ) Notice: Subject to any disclaimer, the term of this patent is extended or adjusted under 35 U.S.C. 154(b) by 0 days.

(21) Appl. No.: 17/410,991

(22) Filed: Aug. 24, 2021

Related U.S. Application Data

(60) Provisional application No. 63/069,590, filed on Aug. 24, 2020.

(51) Int. Cl.
*H04L 65/65* (2022.01)
*H04L 65/61* (2022.01)
*H04L 65/75* (2022.01)

(52) U.S. Cl.
CPC ............. *H04L 65/65* (2022.05); *H04L 65/61* (2022.05); *H04L 65/75* (2022.05)

(58) Field of Classification Search
CPC .......... H04L 65/65; H04L 65/61; H04L 65/75
USPC ......................................................... 709/231
See application file for complete search history.

(56) References Cited

FOREIGN PATENT DOCUMENTS

| CN | 109559763 A | * | 4/2019 | ........... G10L 19/008 |
| JP | H09146743 A | * | 6/1997 | |
| WO | WO-2007019861 A2 | * | 2/2007 | ............. A63G 11/00 |
| WO | WO-2010054779 A1 | * | 5/2010 | ............. H04N 7/144 |
| WO | 11100695 B1 | * | 9/2021 | ............. G06T 13/40 |

* cited by examiner

*Primary Examiner* — Glenford J Madamba
(74) *Attorney, Agent, or Firm* — Patent Law Works LLP

(57) ABSTRACT

These inventions are directed to creating interactive experiences in remote locations across networks that involve actions by users at either end that solicit reactions at remote ends creating an immersive shared environment and experience that allows users to feel they are within the same space. These experiences manifest in various scenarios of play by different playground structures that are illustrated and described in this application. In particular, these inventions create shared interactive playgrounds for children to participate in and enjoy.

20 Claims, 32 Drawing Sheets

600 

```
┌─────────────────────────────────────────────────┐
│ Connect display screens with first and second sides of │
│ see-saw at two remote locations                 │
│ 602                                             │
└─────────────────────────────────────────────────┘
                         ↓
┌─────────────────────────────────────────────────┐
│ Initiate sensor at each of the first and second remote │
│ locations to sense user weight or presence      │
│ 604                                             │
└─────────────────────────────────────────────────┘
                         ↓
┌─────────────────────────────────────────────────┐
│ Initiate motion control at second remote location to │
│ simulate movement of first user at first remote location │
│ 606                                             │
└─────────────────────────────────────────────────┘
                         ↓
┌─────────────────────────────────────────────────┐
│ Initiate motion control at first remote location to │
│ simulate movement of second user at second remote │
│ location                                        │
│ 608                                             │
└─────────────────────────────────────────────────┘
                         ↓
┌─────────────────────────────────────────────────┐
│ Regulate movement by motion control by algorithm │
│ calculating velocity based on user weight and   │
│ designation of desired velocity                 │
│ 610                                             │
└─────────────────────────────────────────────────┘
                         ↓
┌─────────────────────────────────────────────────┐
│ Provide a display on a portion of either first and second │
│ display screens to permit the users to designate the │
│ desired velocity                                │
│ 612                                             │
└─────────────────────────────────────────────────┘
                         ↓
┌─────────────────────────────────────────────────┐
│ Continuously capture images of user at other end by a │
│ camera embedded in both first and second display │
│ screens                                         │
│ 614                                             │
└─────────────────────────────────────────────────┘
                         ↓
┌─────────────────────────────────────────────────┐
│ Transmit and receive captured images from first end to │
│ second end to facilitate viewing by first and second │
│ users of each other as they move up and down    │
│ 614                                             │
└─────────────────────────────────────────────────┘
                         ↓
```

FIG. 6F

SYSTEMS AND METHODS FOR CREATING INTERACTIVE SHARED PLAYGROUNDS

CROSS-REFERENCE TO RELATED APPLICATIONS

The present application claims priority to U.S. Provisional Application No. 63/069,590, filed Aug. 24, 2020, titled "Systems and Methods for Creating Interactive Shared Playgrounds," the entirety of which is hereby incorporated by reference.

BACKGROUND OF THE INVENTION

Field of the Invention

The present inventions are directed to creating shared playgrounds by immersing children into a three-dimensional interactive experience from remote locations across networks. Children see full-body images of other remote children, their actions at one end of a network soliciting reactions at another end, facilitating play with each other within the same space. In particular, the present inventions create shared interactive playgrounds with immersive experiences for children to participate in and enjoy.

Background of the Invention

The internet has made remote communication in all the spheres of life ubiquitous. Virtual online gaming has gained tremendous popularity among young children. More and more, the internet has become a virtual playground. Gaming programs of all types present recreational and educational challenges to keep children entertained while exercising their brains. Such programs include logic puzzles, action games, and building games. Some games create a virtual world with avatars. Most are implemented and executed over desktops or television screens. Some games are "cross platform" allowing children to use different gaming devices, which come with different subscriptions.

Three dimensional ("3D") and other technologies present opportunities for amusement parks and other playground facilities to enhance the entertainment that they provide their many visitors.

For a number of reasons, only some of which are identified above, there is a continuing need for better, more immersive and direct solutions to connect the world to create shared experiences for users at remote places. Creating a network of playground structures or implementation of various types of individual playground structures creates more shared experiences for children, by using similar or identical structures at remote ends, which creates a feeling of spatial and aural proximity.

BRIEF SUMMARY OF THE INVENTION

These inventions create shared playground elements in various ways and sizes to connect at least two remote environments to create immersive spaces to bring together children or others at remote locations within the immersive spaces to share experiences for play or observation. These inventions include 1) a shared tunnel over a network to discover a friend across the world, 2) a shared seesaw propelled by real-time force sensors and accelerometers, 3) a shared digital arm wrestling, 4) a shared digital tug-of-war, 5) a shared digital canvas created over a network for children to create a collaborative mural while viewing each other through the shared digital canvas, 6) a shared intercom with identical pads created with haptics technology for children to feel motion by each other ("interactive play-pads"), 7) shared sounds for children across the world to make music via electronic interactive components activated to produce sounds that are automatically synced to the collaborating location, and 8) a shared lookout to control the movement of 3D cameras to capture high-resolution, live images. These inventions use digital screens in each of the shared playground elements, which create the effect of extending seamlessly. The digital screens may be either projection-based, LCD-based, or LED-based.

BRIEF DESCRIPTION OF THE DRAWINGS

The present inventions as described in this specification are illustrated by way of example, and not by way of limitation in the figures of the accompanying drawings in which like reference numerals are used to refer to similar elements.

FIG. 6F is a flow chart illustrating the method of executing see-saw digital play from remote locations.

DETAILED DESCRIPTION OF THE INVENTION

Embodiments of the present inventions will now be described in detail with reference to the drawings, which are provided as illustrative examples so as to enable those skilled in the art to practice the invention. Notably, the figures and examples below are not meant to limit the scope of the present invention to single embodiments, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents of the components referred to herein by way of illustration.

Figure 1:
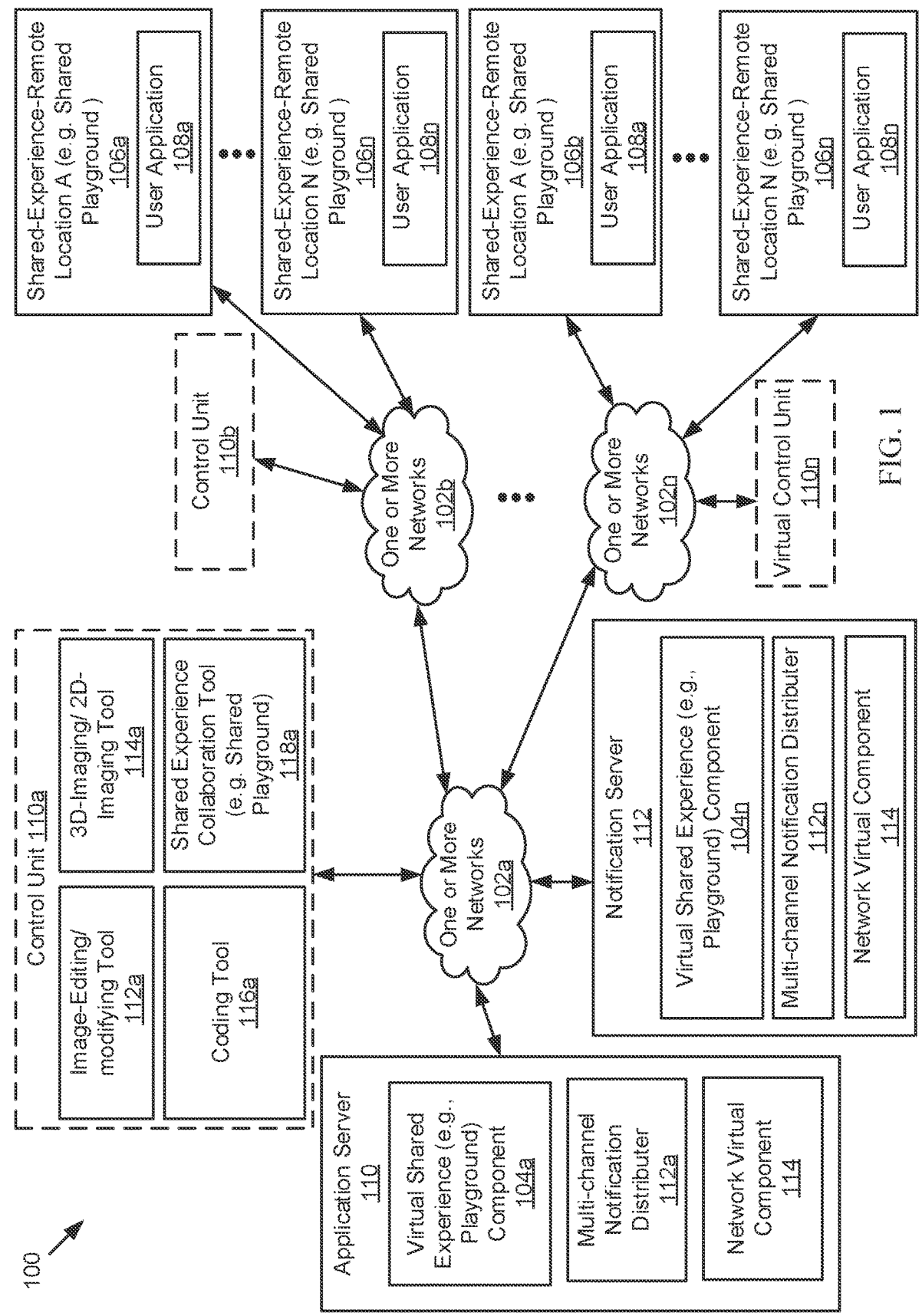
FIG. 1 is a block diagram illustrating an example shared playground environment in accordance with some embodiments of the present invention for immersing children into a three-dimensional interactive experience from remote locations across networks.

Referring now to FIG. 1, architecture for a network of temporary portals 100, each configured to be assembled and disassembled quickly at a desired location is illustrated. The network of temporary portal structures are interconnected physical products that define physical uniform spaces that are substantially identical to create optical and acoustic illusions of spatial and aural continuity between at least two disparate locations. The portal structures, for example 104a-104n, 106a-106n, 108a-108n, are supported by a swappable, back-end system configured to facilitate bidirectional pairing and repairing of the products (via communication networks 102a, 102b through 102n). The portal structures are designed as audio-video "telepresence" booths providing life-size presentations of a distant individual and aural continuity that facilitates real-time conversation with over-laid text translation or aural translation. Portals 104a through 104n (as well as the others illustrated) can be easily assembled on site. In some embodiments, schematics or specially designed pop-up skeletons may be provided. Alternatively, a kit to create the portal structure may be dispatched to the remote locations where they are to be assembled. It should be understood that the particular designs for the portal structures may be changed, adapted, modified, or customized, based on use, application, or desire for their intended purpose and use. The portal structures 104a through 104n may display advertising, company logos, or other visual indicia as desired on their exterior walls. Different technologies, adapted for particular applications or modified, than the ones disclosed here may also be incorporated. The portal structures 104, 106, and 108 should have key elements placed in identical locations within the interior of each unit to create the illusions of spatial continuity through interconnected network (one or more that are illustrated).

The network of portals 100 and portal structures 104, 106, and 108 are a distinct improvement over existing solutions because they provide low-cost virtual spaces, with projection of life-size images that may be either standing or sitting, with true, direct eye contact unlike traditional webcam-computer setups. Advantageously, these portal structures may be easily assembled, by lay persons, who can follow instructions.

Because of its low cost, the network of portals 100 enables the creation of a wide, interoperable network that can facilitate conversation, collaboration, product or service demonstrations, education initiatives, health-based interventions, reporting on human rights from distant locations, customized interconnected immersive environments and so on. In addition, these portal structures 104, 106, and 108 may be used for video gaming, providing video games at different locations, uniform engagement with the screen surface, and sharing a virtual space, as if to simulate that several players are playing in the same virtual space. Advantageously, the portal structures 104, 106, 108 are configured for communication by any network, including internet and satellite networks. They may be powered by electricity or solar options.

The portal structure 104, 106, 108 includes a new camera and lens configuration, which replaces standard webcams that have been optimized for horizontal and warped coverage (on laptops and boardrooms). The new camera and lens configuration, in combination with projectors or large screen surfaces, creates the more immersive, shared experiences.

The example portal network architecture, illustrated generally at 100, includes a plurality of portal structures, one of which at location A (e.g., New York) is illustrated in greater detail. The portal structure 104a, which may be constructed as illustrated or differently for easy transportation and assembly to define an interior space of predetermined size. In one embodiment, the portal structure may be a shipping container. In yet another embodiment, the portal structure may have a "pop-up" design, which would enable anyone to create the portal in a room or outdoors in a matter of a short time (e.g., minutes). Details of the portal structure assembly will be described later. The architecture 100 is a collaborative network, which provides anyone the opportunity of using a portal and plugging into an online network (illustrated by networks 102a, 102b through 102n). In one embodiment, the collaborative network may be a cloud-based environment (curated by third parties or not) with cloud-based applications that enable collaborative audio and video editing, coding, 3D imaging, etc. In this collaborative network, the portals 104, 106, and 108 serve as a space into which people may enter, to collaborate in a high-quality, uniform environment with direct access to the cloud. This direct access is critical in regions with low-bandwidth transmission and for real-time online collaboration. Users may go online later to edit and promote materials with colleagues.

The network 102 may be a conventional type, wired or wireless, and may have numerous different configurations including a star configuration, token ring configuration or other configurations. Furthermore, the network 102 may include a local area network (LAN), a wide area network (WAN) (e.g., the Internet), and/or other interconnected data paths across which multiple devices may communicate. In some embodiments, the network 102 may be a peer-to-peer network. The network 102a-n may also be coupled to or include portions of a telecommunications network for sending data in a variety of different communication protocols. In some other embodiments, the network 102 includes Bluetooth communication networks or a cellular communications network for sending and receiving data including via short messaging service (SMS), multimedia messaging service (MMS), hypertext transfer protocol (HTTP), direct data connection, WAP, email, etc. In addition, although FIG. 1 illustrates a network 102 coupled to the portals 104, 106, and 108; in practice one or more networks 102 may be connected to these entities.

FIG. 1 further illustrates an example architecture for creating a shared playground environment 100. The shared playground environment 100 includes a control unit 110a, 110b, through 110n. In some embodiments of the shared playground network architecture, such control units 110a may be configured to manage or control operations of the various remote play structures that may be widely distributed and located across the globe. The control unit 110a may be configured to control playground structures, by region, or by other criteria, for example telecommunication carrier collaborations. As illustrated, the control unit 110a includes an image/editing/modifying tool 112a, a 3D-imaging/2D- imaging tool 114a, a coding tool 115a, a shared-experience collaborating tool 118a. The control unit 110a may be a hardware server including a processor, a memory and network communication capabilities. The control unit 110a is communicatively coupled to the network 102a, via a bi-directional signal line. Multiple networks (one or more) are illustrated by networks 102a, 102b, through 102n. It should be recognized to one skilled in the art more represents a group of network configurations. In some embodiments, the control unit 110a sends and receives data to and from one or more of the remote locations 104a, 106a, and 108a, via the network 102. The control unit 110a may track playground structures that are active. In some embodiments, the control unit server 110a may track the process of deployment of the playground structures, track inventory, requests etc.

In some embodiments, the image editing tool 112a provides editing tools that enable a user to modify a 2-D image, e.g., a digital photograph image. Typical editing tools include a selection tool for selecting a region or object in the image, a copy tool to copy selected objects, a paste tool to paste an object copied from the image or an external object (e.g., an object copied from another image source) into the image, and image modification tools that enable the user to change the color, shape, size, or proportion of a selected object. Editing tools for 2-D images operate in the plane of the image because the image editing applications operate on the assumption that the image is coplanar to the camera's focal plane. However, the image may contain elements that are 2-D representations of three-dimensional (3-D) objects and have a perspective that affects their appearance based on their distance from the camera. The editing tools do not account for the perspective, which can make regions of the image having perspective challenging to edit. The image editing tool 112a also provides techniques to provide a perspective editing tool for performing edits in regions of an image having perspective. The perspective editing tool enables the user to identify one or more regions in a 2-D image having perspective, i.e., perspective areas. The user can perform various editing operations on an object such that the edited object conforms to the perspective of the perspective area. The 3D imaging tool 114a may include photo-editing software that allows users to create 3D manipulations to illuminate the hidden areas of an image. The coding tool 116a may include various coding mechanisms known to those skilled in the art to implement and execute additional functionalities and a portals collaboration tool 118 may include interfaces for various users to collaborate and meet in virtual forums.

The shared-experience-remote location A (e.g., shared playground) 106a has a user application 108a (through 108n) that is in communication with the Application Server 110 via the network 102. Several shared-experience-remote locations are represented at locations A through N. Several playground structures are illustrated as coupled to the different network nodes (102b through 102n). The Application server 110 has a virtual shared experience (e.g., playground component) 104a, a multi-channel notification distributor 113a, and network virtual component 114. Another embodiment of the application server 110 is illustrated as a notification server 112 with the same components 104n, 112n, and 114n.

Figure 2:
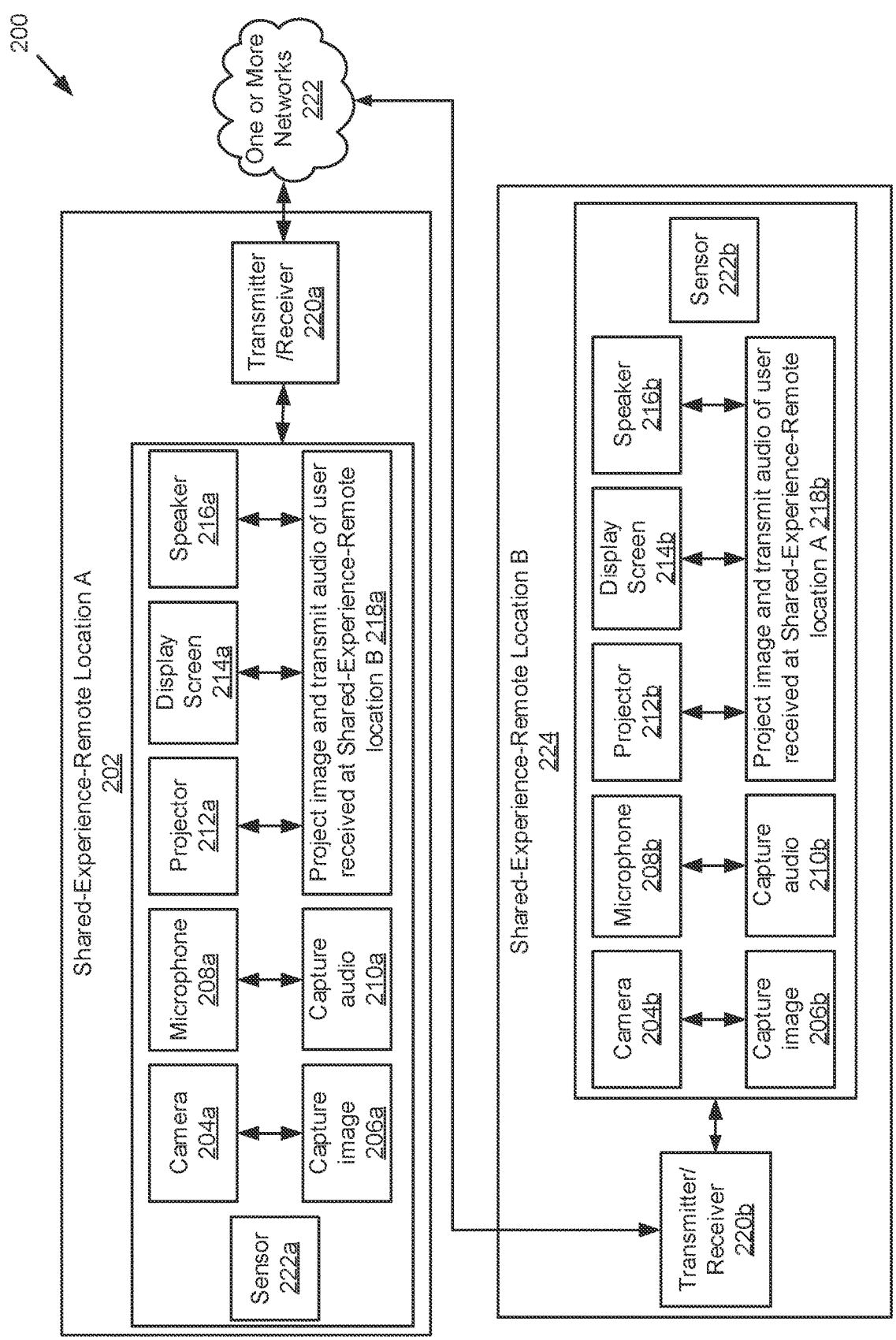
FIG. 2 is the hardware and software at the remote locations.

Referring now to FIG. 2, example playground structures in an environment 200 at locations A (202) and B (224) are illustrated generally by reference numerals as designated in parentheses. The playground structure at example location A, indicated by reference numeral 202 represents the hardware and software for any of the structures illustrated herein. The playground structure 202 includes a transmitter/receiver 220a, in communication with a camera 204a, a microphone 208a, a projector 212a, a display screen 214a, a speaker 216a, a capture image unit 206a, a capture audio unit 210a, a module 218a that projects images and transmits audio of the user received at location B, and a sensor 222a. The portal structure 224 at location B includes similar components to accomplish the same functionalities and operations at location B. The portal structure 224 includes a Transmitter/Receiver 220b coupled and in communication with a camera 204b, a microphone 208b, a projector 212b, a display screen 214b, a speaker 216b, a capture image unit 206b, a capture audio unit 210b, a module 218b that projects image and transmits audio of the user received at location B, and a sensor 222b. A child at the remote location B using a playground structure 224 views a child from location A, as both stand/sit face-to-face sharing an immersive experience, as if in the same room engaged in a play session. The communications are transmitted via a network 222. In operation, the camera 204a at location A, located behind the flat screen (display screen 214a) in the playground structure at location A captures image data of the subject at location A (e.g., the first child at one end of the tunnel) via the tiny hole in the flat screen (display screen 214a), and transmits that image data to location A, which is received by the receiver 220b. The image data is projected by the projector 212b at location B on the flat screen (display screen 214b) of the portal at location B, so the observer (the second child at the other end of the tunnel) views the subject (the first child) within the interior space of the tunnel at location B, experiencing the sensation that both are in the same room. The camera 204b behind the flat screen (display screen 214b) at the playground structure at location B, via the tiny hole 226 captures image data of the child (in this instance the subject) and transmits the image data via the transmitter 220b to the receiver 220a within the playground structure at location A and that image data is projected by the projector 212a on the flat screen of the portal at location A for the other child to see (in this instance, first child is now the observer). The microphones 208a and 208b at either end with the speakers 216a and 216b, capture the audio (by audio capture units 210a and 210b). In some embodiments, the subject may be located anywhere between 5-20 feet from the flat screen.

In some instances, the playground structures at locations A and B may be immersive structures configured to provide some pre-recorded encounters with others. In such instances, the subject may be represented by pre-recorded images. In some embodiments, the display screens, either of 214a or 214b are digital screens that may be used as a digital canvas in accordance with any of the configurations illustrated here. The playground structures in these instances may be configured according to the various examples illustrated here as well as other example that are similar.

Figure 3A:
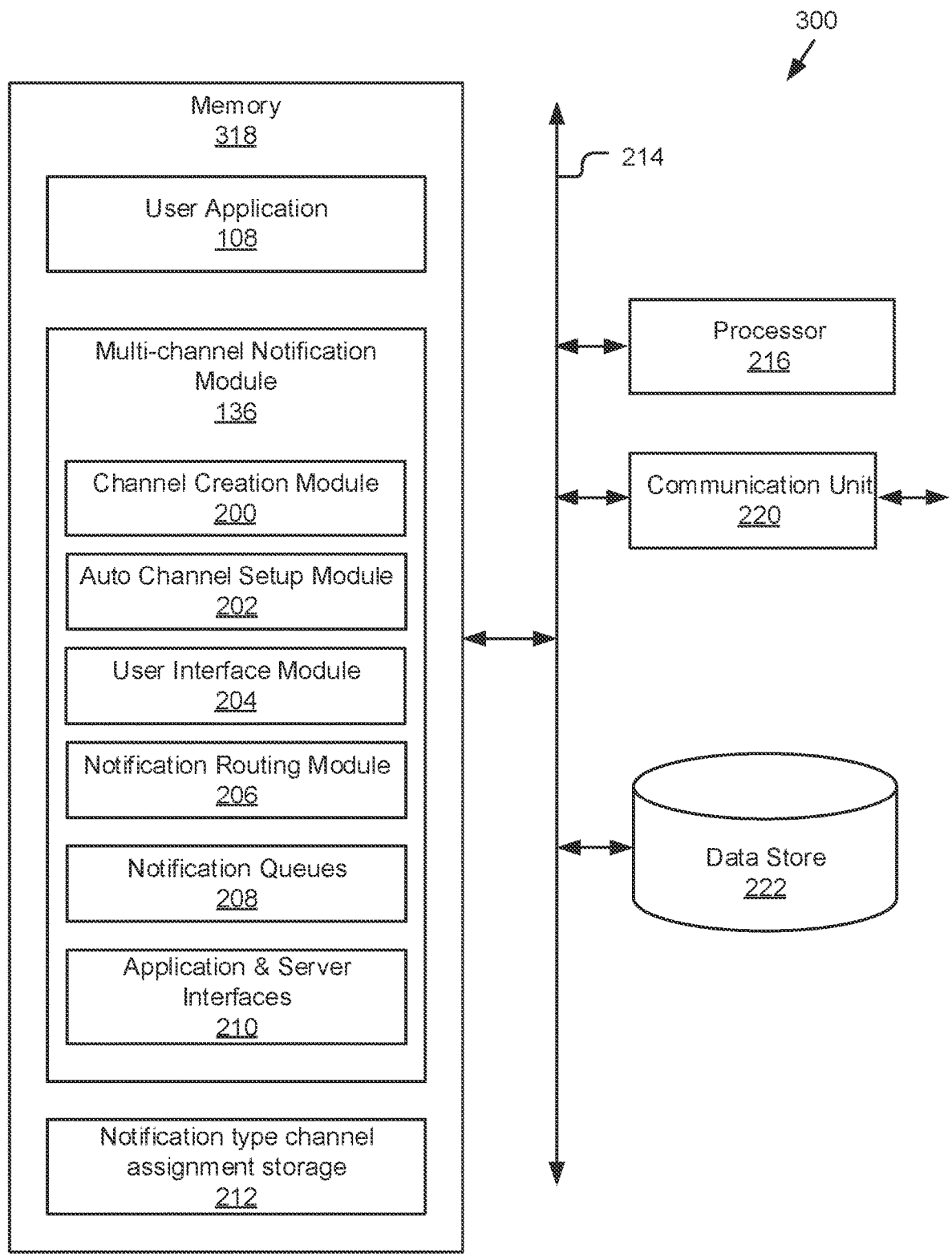
FIG. 3A is an example illustration of the user application and hardware components for executing it.
Figure 3B:
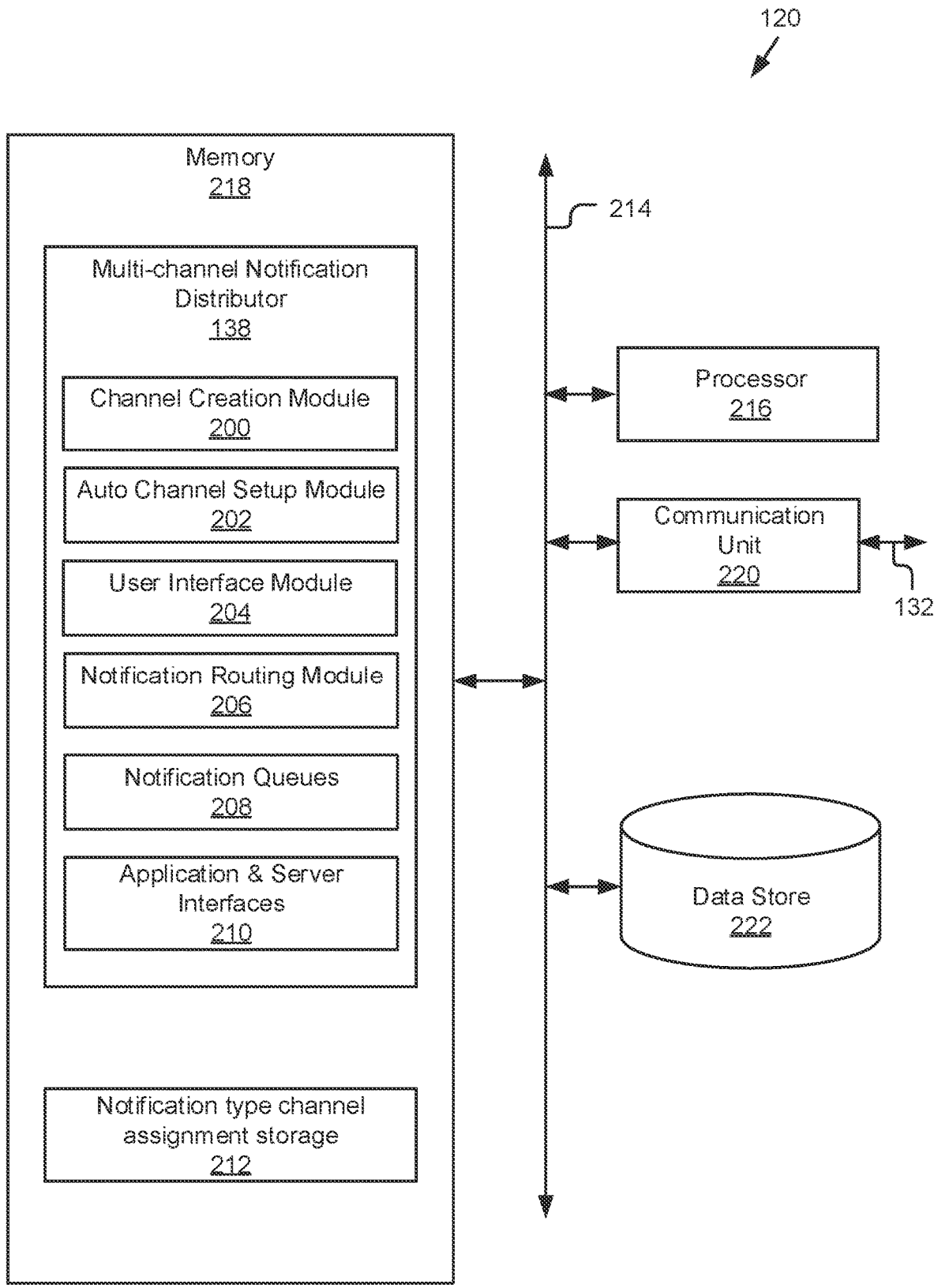
FIG. 3B is an example illustration of the control modules of the shared playground illustrated in FIG. 1.

Referring now to FIGS. 3A and 3B, example structures 300 and 120 are illustrated to represent user applications at the application server and at a remote location. Each representation includes memory 318, which stores the particular user application 108, the multi-channel notification module 136, the notification type channel assignment storage 212, a processor 216, a communication unit 220, and a data store 222. The multi-channel notification module 136 includes a channel creation module 200, an auto channel setup module 202, a user interface module 204, a notification routing module 206, notification queues 208, application and server interfaces 210, and a notification type channel assignment storage 212. The memory and processor may be any suited for large data processing systems. The communication unit 220 manages the different communication protocols between the playground structures at different locations. The user application 108 controls and executes a particular type of play (e.g., digital canvas or see-saw). The multi-channel notification module 136 tracks communications over different network channels and send communication notifications before, during, and after connections are executed. Each of the software modules are executed by executable code and include instructions to implement the various functions including channel creation, auto channel setup (as programmed), routing of notification signals, creating notification queues, determining the channel type and assigning it.

Figure 3C:
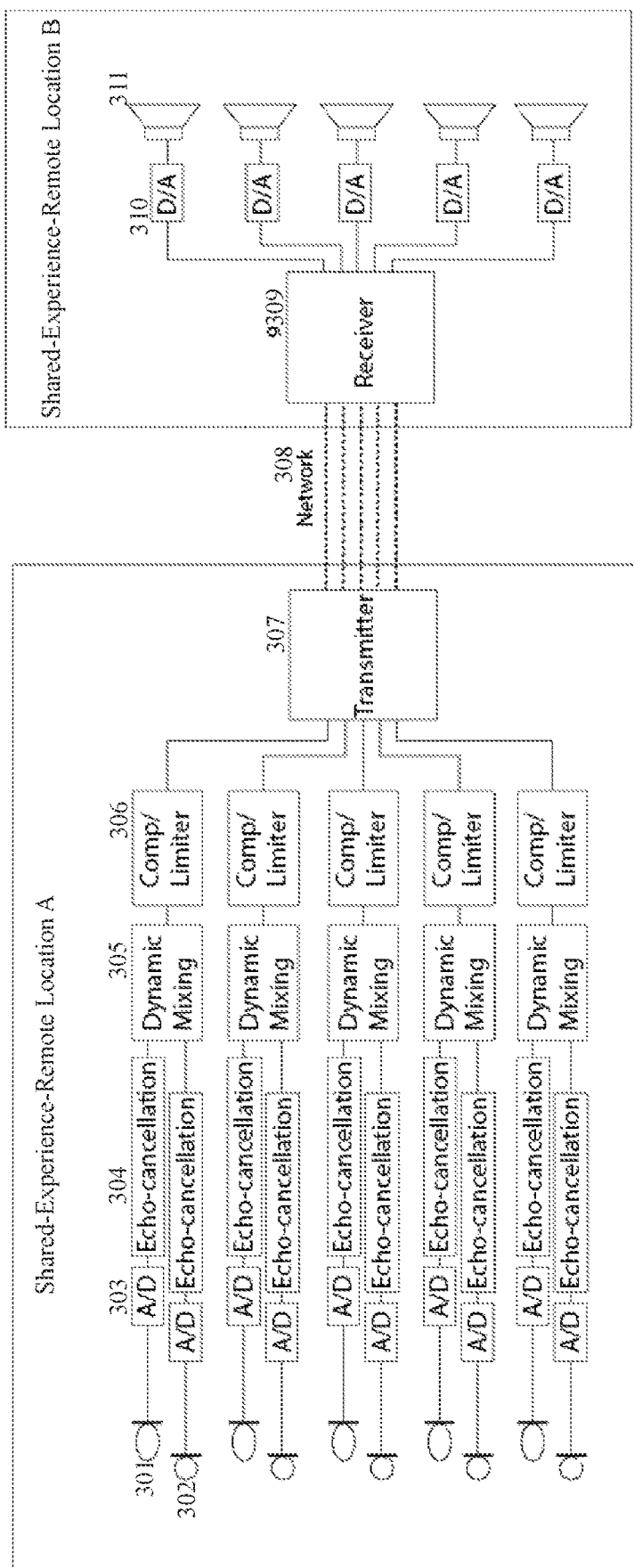
FIG. 3C is a block diagram illustrating the shared experience from two remote locations with the transmitter and receiver configuration required to execute shared sessions.

Referring now to FIG. 3C, the signal path between different nodes in example locations A and B, respectively, are illustrated. Each of the microphones at any of the playground structures (e.g., 301 and 302) are coupled through an analog-to-digital (A/D) converters 303 and are subject to an echo-cancellation algorithm 304. These two signals are combined using a dynamic mixing algorithm 305 to balance the ratio of a vocal signal to an environmental signal. After compressor and limiter processes 306, the signals are transmitted via transmitter 307 over the network 308 through a receiver 309 to pass through an array of digital-to-analog converters 310 before reaching speakers 311 at the other end (e.g., example location B)

Figure 4A:
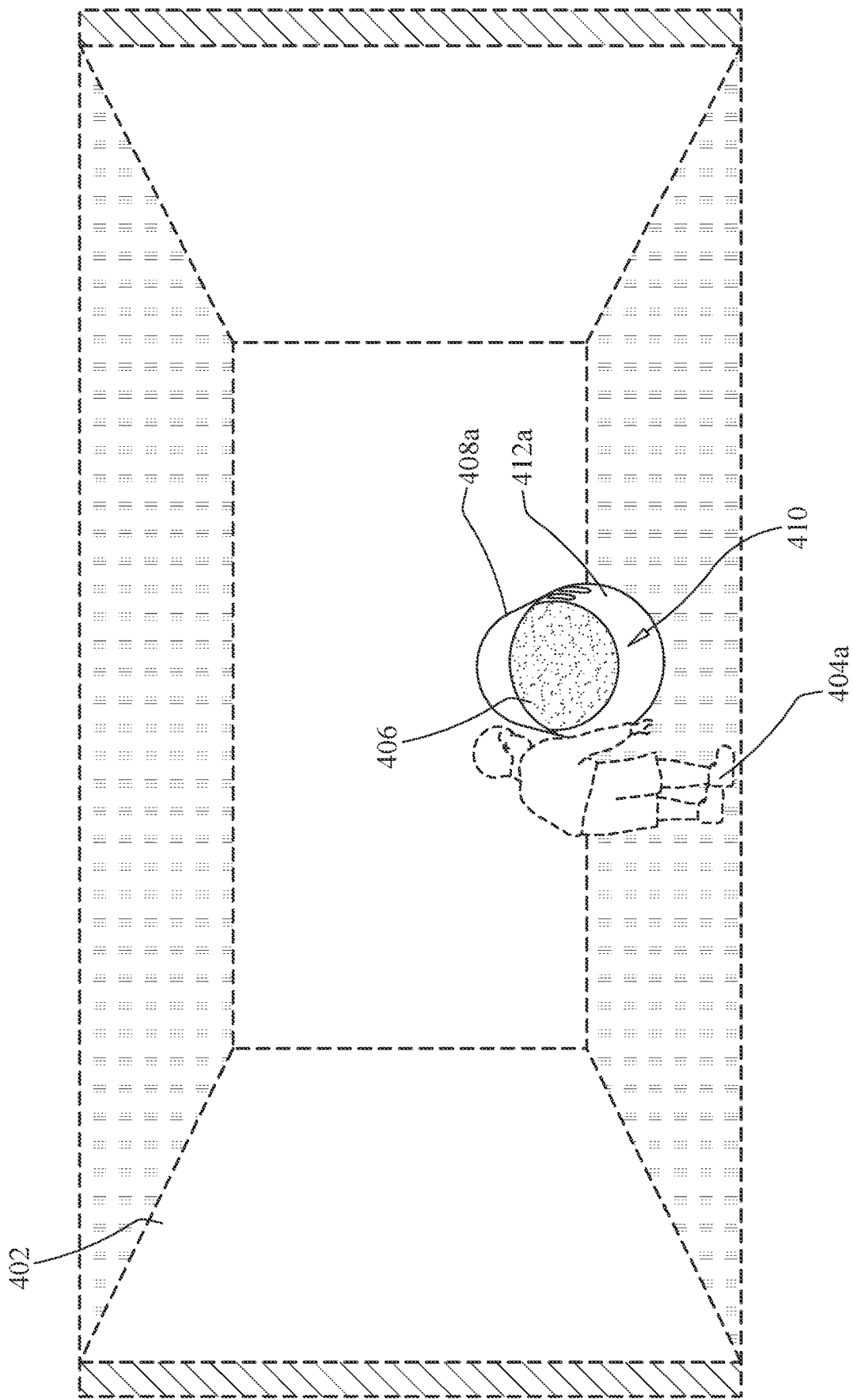
FIG. 4A is a front perspective view of a shared tunnel in accordance with a system implemented over a network between two remote locations shown within a room; the shared tunnel is configurable in various sizes and has a display screen allowing participants (e.g., children) to play globally across the world (e.g., children to climb into tunnels and discover a new friend across the world and engage one another around the world as if in the same tunnel or play tube).

Referring now to FIG. 4A, a front perspective view of a shared tunnel 408a in an environment 402 in accordance with one embodiment of shared play is illustrated. The shared immersive experience is created over a network (102, FIG. 1) between two remote locations (e.g., A and B) shown within a room 402 (at either end of the network); the shared tunnel 408a is configurable in various sizes and has a display screen 406 allowing participants 404a (e.g., children) to play globally across the world (e.g., children to climb into tunnels and discover a new friend across the world and engage one another around the world as if in the same tunnel or play tube). The circular tunnel 408a has a pipe-like structure 410 with an inner surface 412a, on which a child may crawl and enter the shared tunnel 408a. It should be recognized that the reference numerals ending with "a" designate particular components at location A. Likewise, similar components at location B would be designated by reference numerals ending with "b."

Figure 4B:
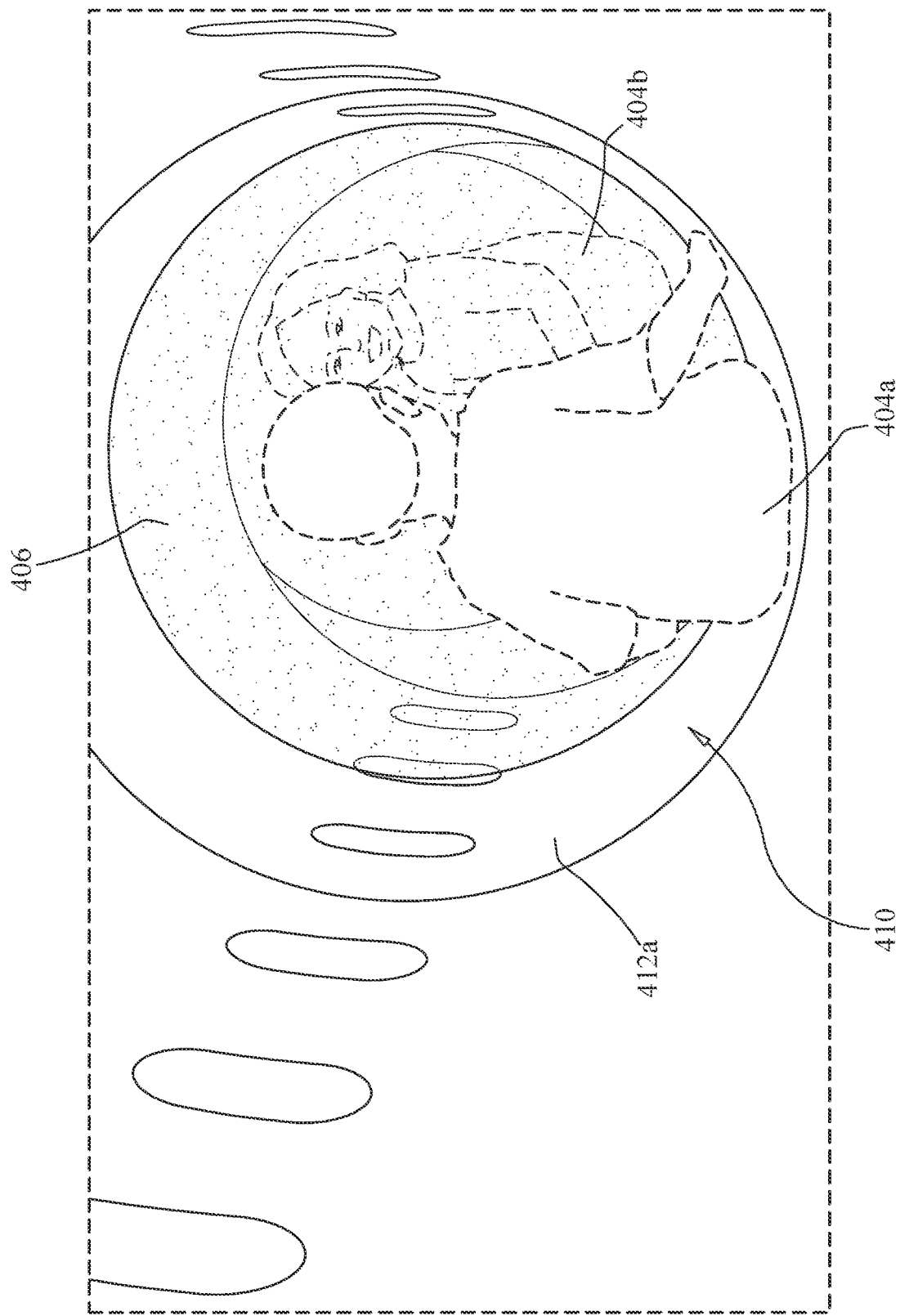
FIG. 4B a front perspective view within one end of the shared tunnel (both ends are similar); at either end, a circular display screen including an embedded camera to continuously capture images at either end and transmit them to the other end, the shared tunnel seeming to extend seamlessly from one end of the shared tunnel into the other end of the shared tunnel such that the participants (e.g. children, a boy and girl as shown) at both ends feel as though they are sitting within the same tunnel sharing the same space (the immersive reality creates a feeling of proximity); the display screen at either end is either a projection screen, a LCD screen, or a LED screen; the two ends of the tunnel also have elliptical openings on two sides of the tunnel, through which adults (e.g. guardians) may peer into the shared tunnel and observe the participants at play.

Referring to FIG. 4B, a front perspective view within one end of the shared tunnel (both ends are similar); at either end, a circular display screen 406 including an embedded camera to continuously capture images at either end and transmit them to the other end, the shared tunnel seeming to extend seamlessly from one end of the shared tunnel into the other end of the shared tunnel such that the participants 404a and 404b (e.g. children, a boy and girl as shown) at both ends feel as though they are sitting within the same tunnel sharing the same space (the immersive reality creates a feeling of proximity); the display screen 406 at either end is either a projection screen, a LCD screen, or a LED screen; the two ends of the tunnel also have elliptical openings on two sides of the tunnel, through which adults (e.g. guardians) may peer into the shared tunnel and observe the participants at play. The circular tunnel has a pipe-like structure 410 with an inner surface 412a.

Figure 4C:
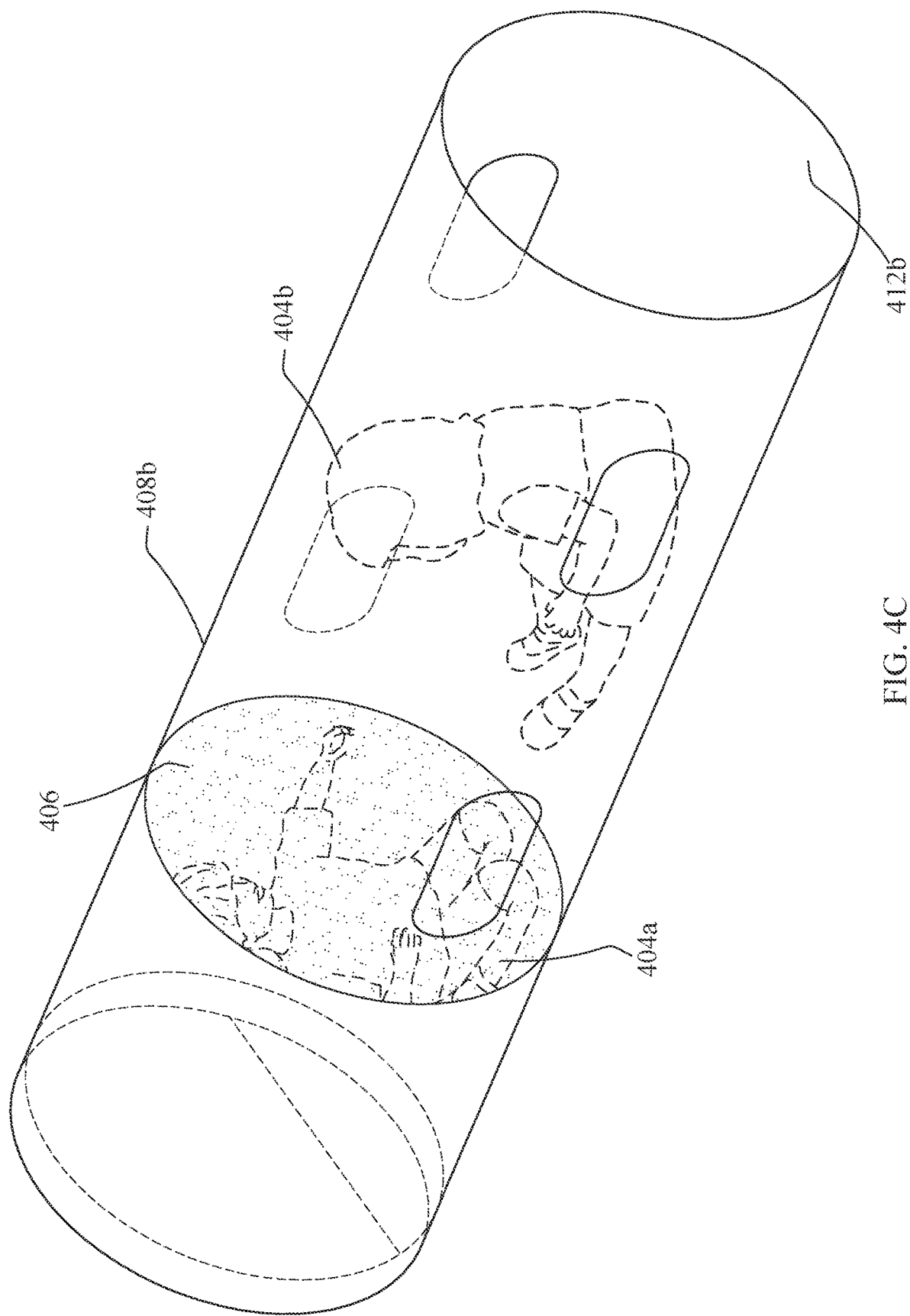
FIG. 4C is a side perspective view of the shared tunnel illustrating two children at remote locations sharing the space within the tunnel, the shared tunnel having an audio component with a speaker and microphone at both ends to allow the two participants to converse.

FIG. 4C is a side perspective view of the shared tunnel illustrating two children 404a and 404b at remote locations sharing the space within the tunnel, the shared tunnel having an audio component with a speaker, microphone, and display screen 406 at both ends to allow the two participants to converse. The circular tunnel 408b of the child 404b has an inner surface 412b.

Figure 4D:
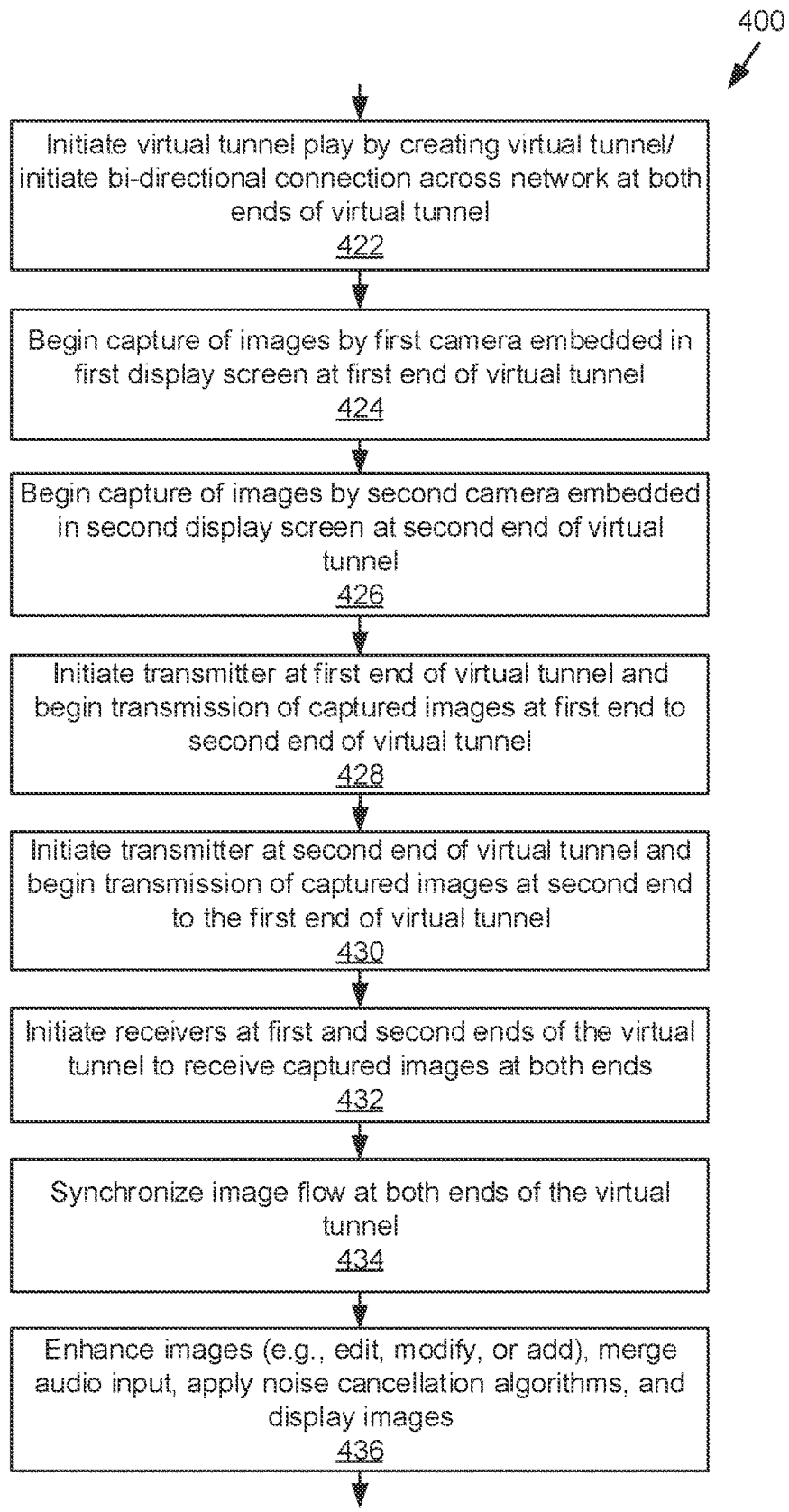
FIG. 4D is a flow chart of the process for executing virtual tunnel play as an example of a shared immersive experience for children.

Referring to FIG. 4D, 400 illustrates a flow chart outlining the various steps to initiate virtual tunnel play. To initiate virtual play, a bi-directional connection across the network at both ends of the tunnel is initiated 422. The capture of images is initiated by the first camera embedded in the first display screen at the first end of the tunnel 424. The second camera embedded in the second display screen at the second end of the virtual tunnel then begins the capture of images 426. The process continues with the initiation of the transmitter at the first end, which begins the transmission of captured images from the first end to the second end 428. After the receipt of the transmission from the first end, the transmitter at the second end of the virtual tunnel begins the transmission from the second end to the first end of the virtual tunnel 430. The receivers at the first and second end received the captured images transmitted from both ends 432. After the receipt of the captured images, the image flow at both ends is then synchronized 434. Finally, the images are enhanced, the audio input is merged, noise cancellation algorithms are applied, and the images are displayed on the display screens at the first and second ends 436.

Figure 5A:
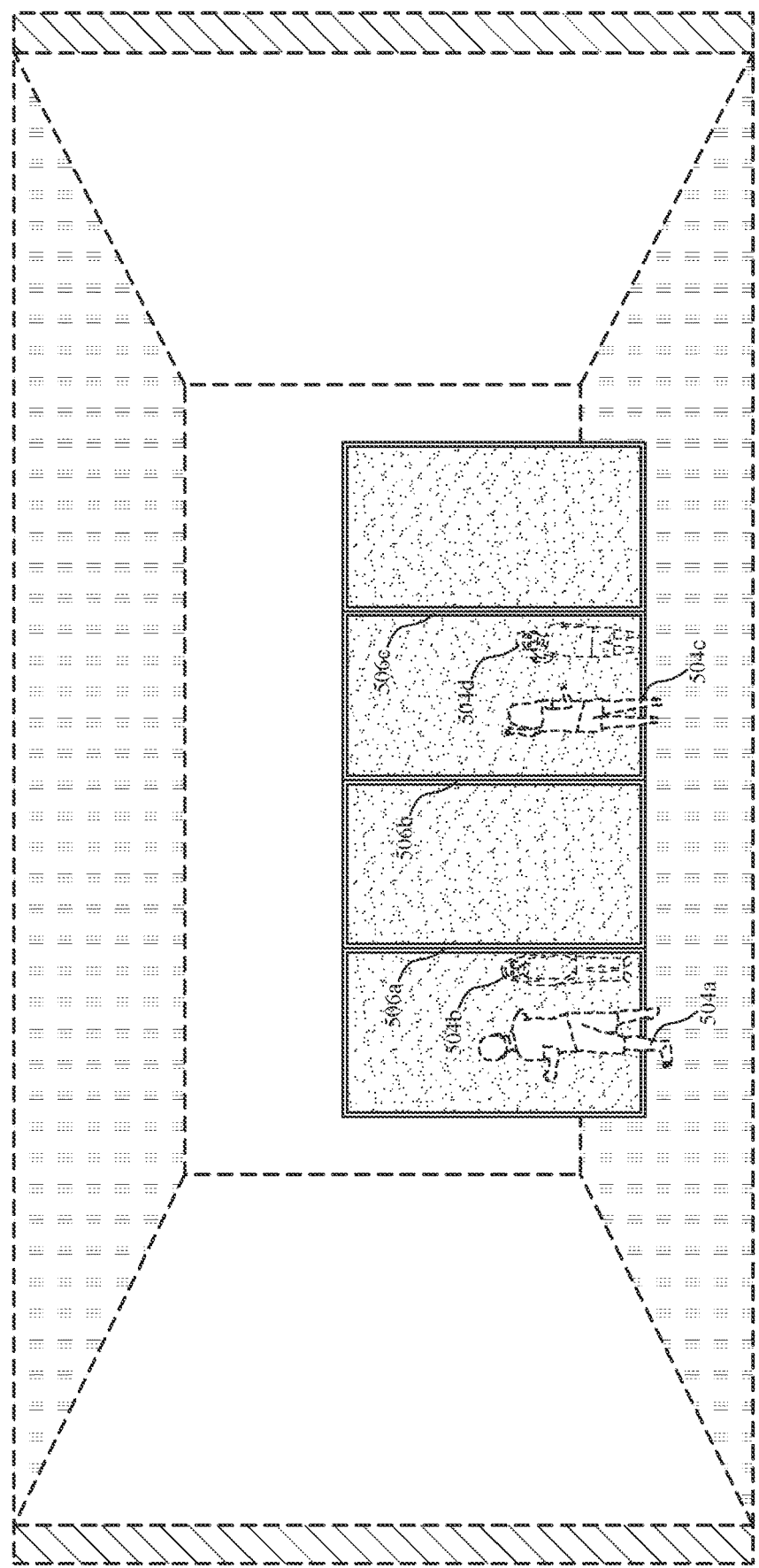
FIG. 5A is a front perspective view of a shared digital canvas in accordance with some embodiments of the present invention that is a live window through which the two participants at remote locations can share an interactive experience in real time as they see and converse (through the audio component) with each other while they draw, paint or otherwise express their artistic talent; with this digital canvas, children across the world can draw together live, on the same digital canvas to create a global collaborative mural.

FIG. 5A is a front perspective view of a shared digital canvas (opposite ends are connected, see 506a, 506b, and 506c) that is a live window through which the two participants at remote locations can share an interactive experience in real time as they see and converse (through the audio component) with each other while they draw, paint or otherwise express their artistic talent; with this digital canvas, children across the world (504a, 504b, 504c, 504d) can draw together live, on the same digital canvas to create a global collaborative mural.

Figure 5B:
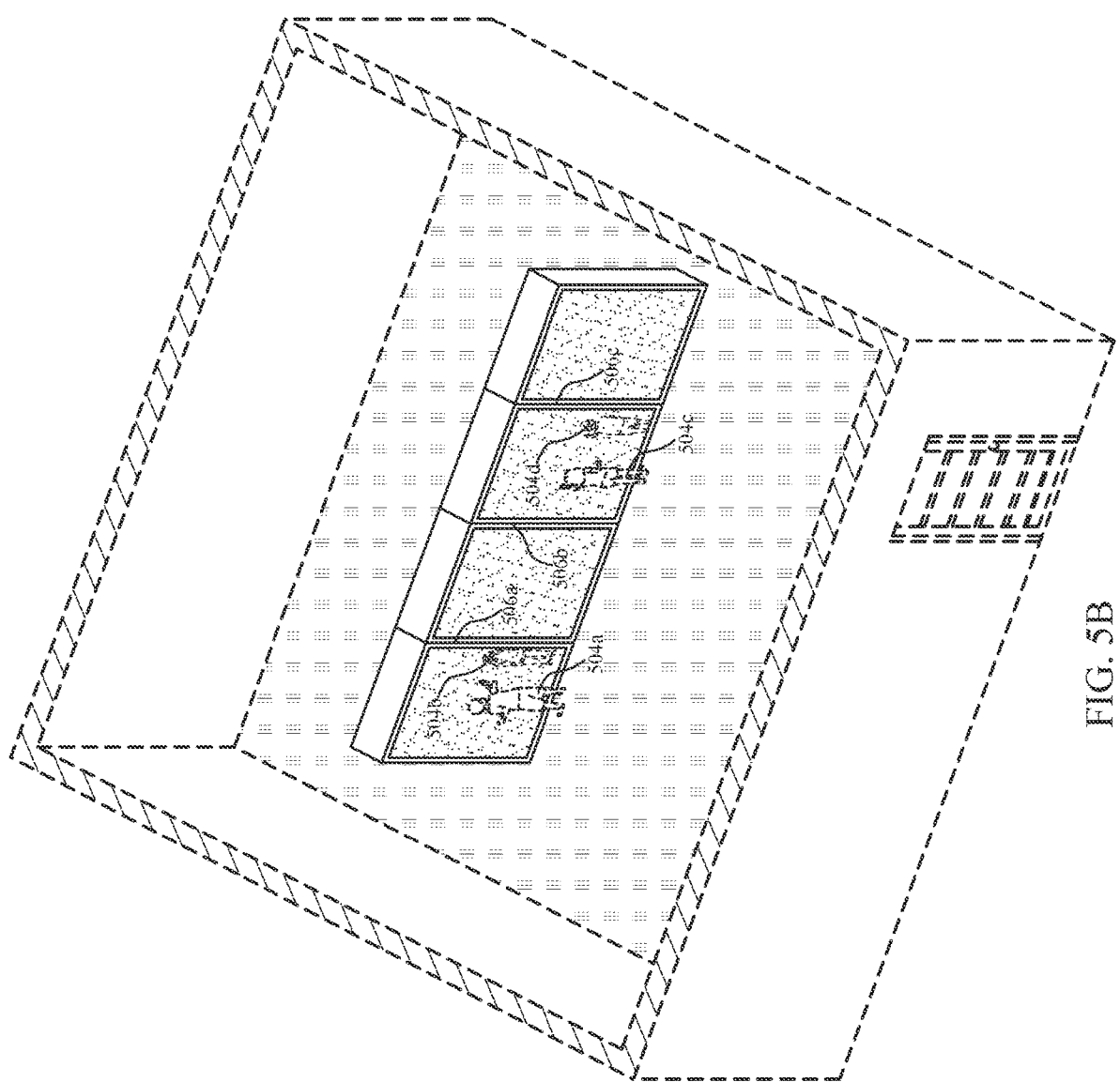
FIG. 5B is a top and front perspective view of the shared digital canvas at one end of a network (similar at the other end) located within a room.
Figure 5C:
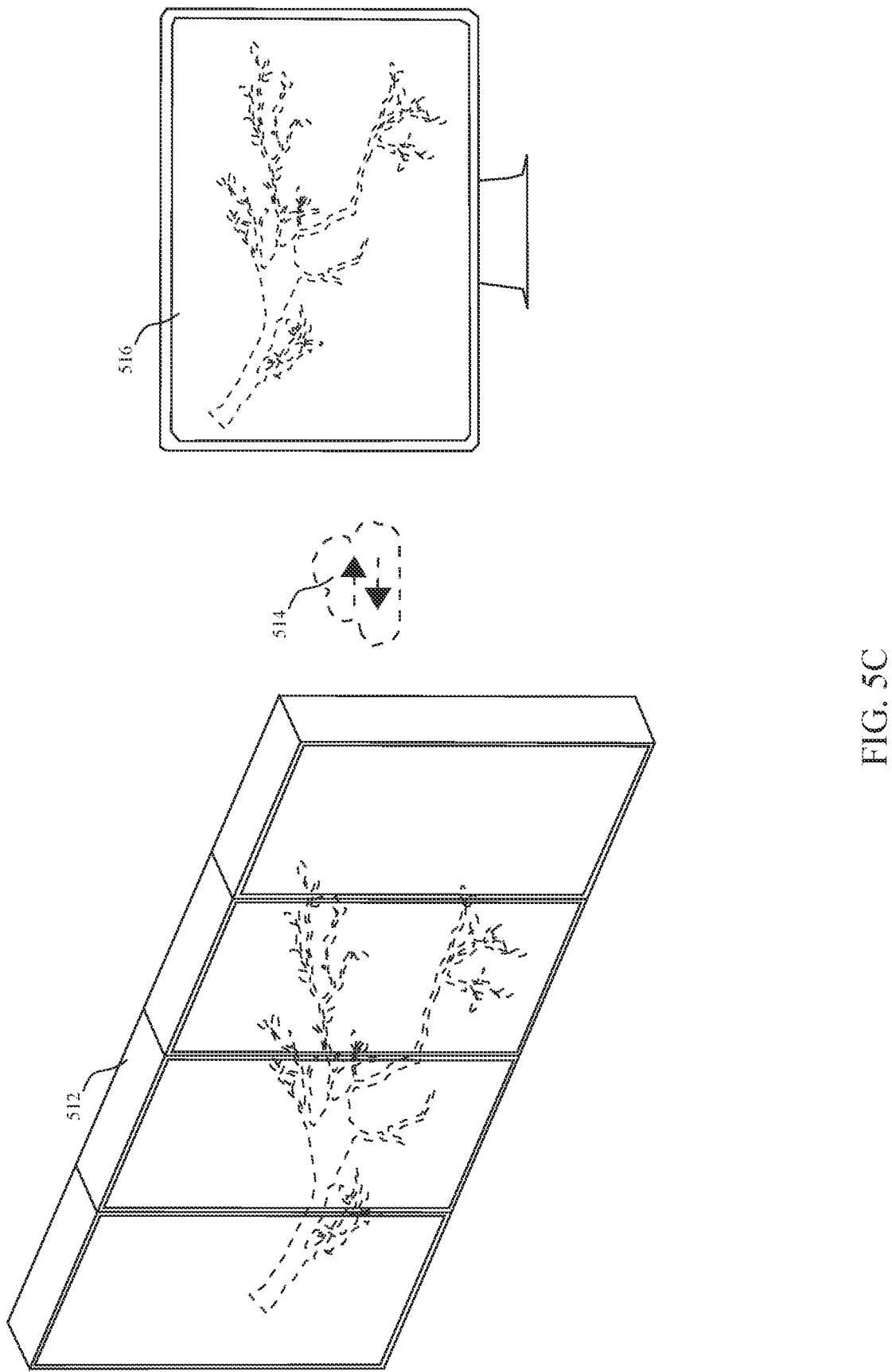
FIG. 5C is a perspective view of the digital art canvases linked to a remote screen so that artwork that is collaboratively created can be freely accessed, viewed, shared, and saved in real-time on a website, in an infinitely expanding work of art.
Figure 5D:
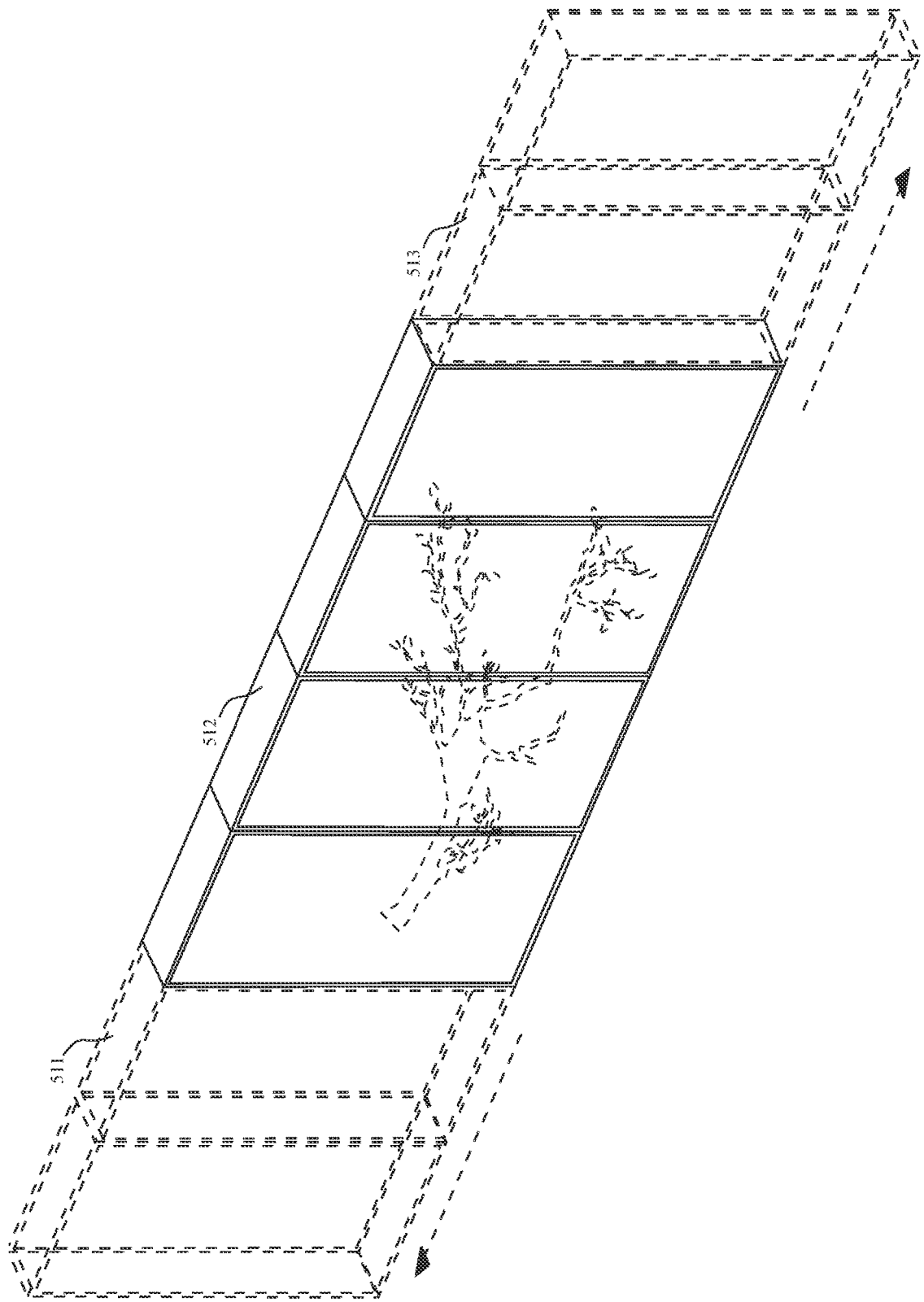
FIG. 5D is a front and side perspective view of expanding digital art canvases linked together (e.g., between 0-16 screens), showing how digital canvases can connect, allowing participants at one location to paint together, or to paint with similar configurations at partner locations simultaneously.

FIG. 5B is a top and front perspective view of the shared digital canvas at one end of a network (similar at the other end) located within a room. FIG. 5C is a perspective view of the digital art canvases (top edge 512 may be configured with varying thickness) linked to a remote screen so that artwork that is collaboratively created can be freely accessed, viewed, shared (514), and saved in real-time and displayed on a website (516), in an infinitely expanding work of art. FIG. 5D is a front and side perspective view of the digital art canvases linked together (e.g., between 0-16 screens, see tops 512, when expanded 511 and 513), allowing participants at one city to paint with partner locations simultaneously.

Figure 5E:
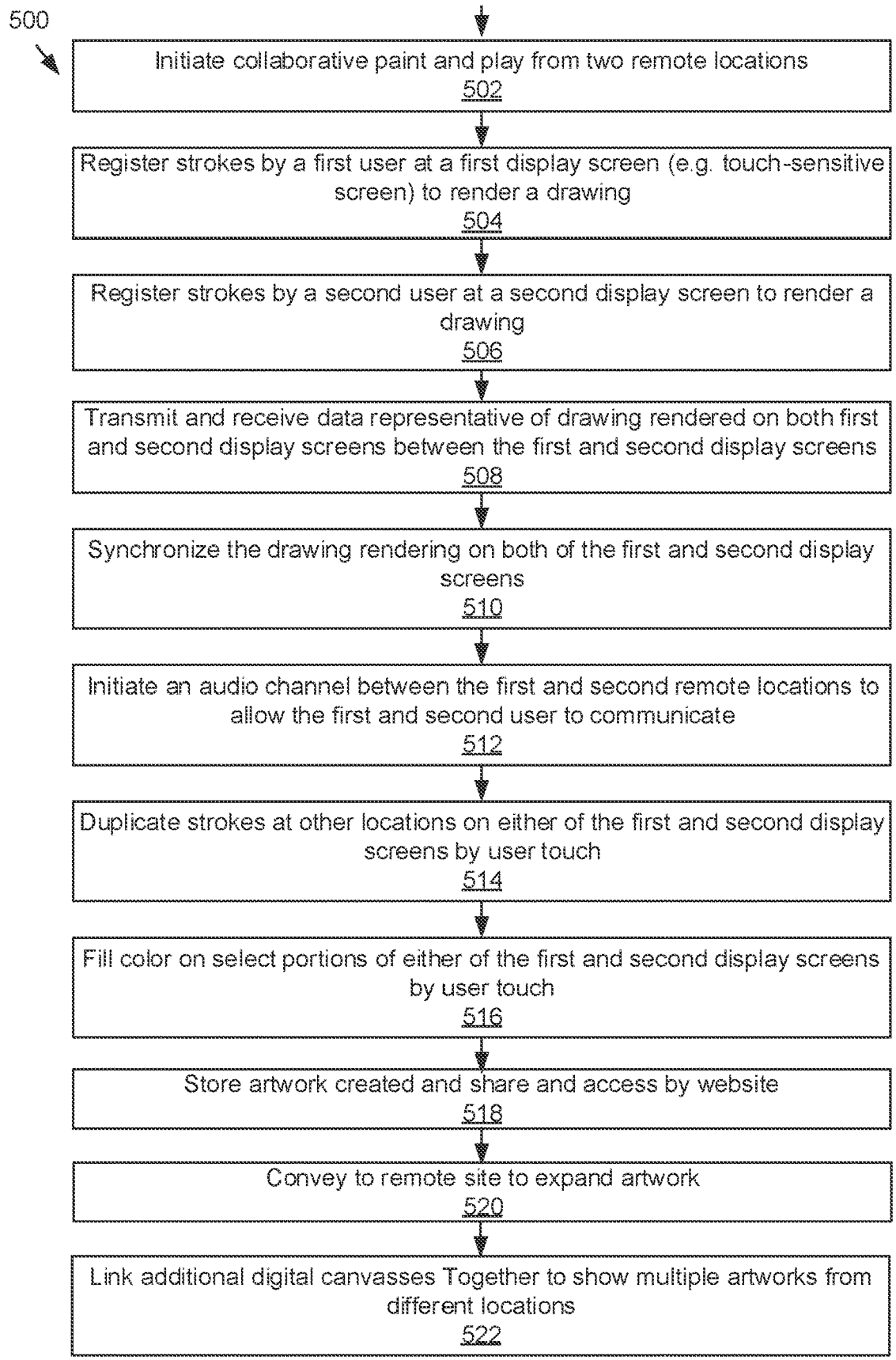
FIG. 5E is a flow chart illustrating the method for executing digital art collaboration.

Referring now to FIG. 5E, the process 500 begins at step 502, including one or more operations with executable code configured to initiate collaborative paint and play from two remote locations. The process 500 proceeds to the next step 504, including one or more operations configured to register strokes by a first user at a first display screen (e.g., touch sensitive screen) to render a drawing. The process 500 proceeds to the next step 506, including one or more operations configured to register strokes by a second user at a second display screen (e.g., touch sensitive screen) to render a drawing. The process 500 proceeds to the next step 508, including one or more operations configured to transmit and receive data representative of a drawing rendered on both first and second display screens, synchronized between the first and second display screens. The process 500 proceeds to the next step 510, including one or more operations configured to synchronize the drawing rendering (in time) on both first and second display screens. The process 500 proceeds to the next step 512, including one or more operations configured to initiate an audio channel between the first and second remote locations to allow the first and second users (children) to communicate. The process 500 proceeds to the next step 514, including one or more operations configured to duplicate strokes at other locations on either of the first and second display screens by user touch. The process 500 proceeds to the next step 516, including one or more operations configured to fill color on select portions of either of the first and second display screens by user touch. The process 500 proceeds to the next step 518, including one or more operations configured to store artwork created and share and access each work by a website. The process 500 proceeds to the next step 520, including one or more operations configured to convey to the remote site to expand artwork. This may be in instances when additional locations are invited to join. The process 500 proceeds to the next step 522, including one or more operations configured to link additional digital canvasses together to show multiple artworks from different locations.

The present inventions in this embodiment create a shared canvas for a shared vision. It should be recognized that any existing digital whiteboards are merely like drawing on blackboards, not windows. With a whiteboard, people see the image of what was drawn at the distant location but not the person doing the drawing. This is one type of experience. The present invention is configured to provide a different, stronger experience, by allowing a child/user on one side of a digital screen to be able to view another child doing the drawing as if he or she was standing on the other side of a window and drawing with a marker on that window (shared screen). The advantage of this is that participants may see each other, eye-to-eye and speak to one another through a shared digital surface, even as they are drawing on it. This provides an engaged process of creation. Also, for creative applications, and particularly, for the young, feeling the presence of the distant participant is significant and bonding. This particular embodiment with a single shared screen configuration eliminates the need for a second screen. It also facilitates eye contact between participants as they collaborate.

In order to accomplish this experience, each digital canvas that is shared by remote participants consists of a projector, computer, and a transparent touch-surface (drawing on RF technology, or many others), and a camera. The camera is positioned 3' or more back (or behind) from the transparent touch surface and is placed at eye level. A projector is placed 3' or more from the transparent surface, behind it, for a rear projection. The camera conveys a live, full-body presentation of the person in front of the digital canvas to the alternate location, which is then projected onto the surface. The participant at the alternate location is similar captured, conveyed and presented. The base image, then, for each participant, is the image of the person or people at the other location. Whatever is touched onto the screen via hand, virtual pen, or other mechanism, is then conveyed on top of that image for both participants. The conveyed image is manipulated and flipped so that both participants feel like they are looking at the opposite side of the window before them.

Anything captured in this digital canvas or wall, including the video of the participants, may be relayed live to other units, recorded, captured, streamed and otherwise shared. The wall may be configured to be modular and may have many units. This means that participants may choose whether or not to draw on a surface or simply use it as a portal screen. The reason this works is because the viewer is kept back from the camera by an adequate distance so he/she can draw on the surface and yet be conveyed in full as a complete image to the other participant. In one embodiment, two or more cameras are used for 3D effects or image calibration.

Figure 6A:
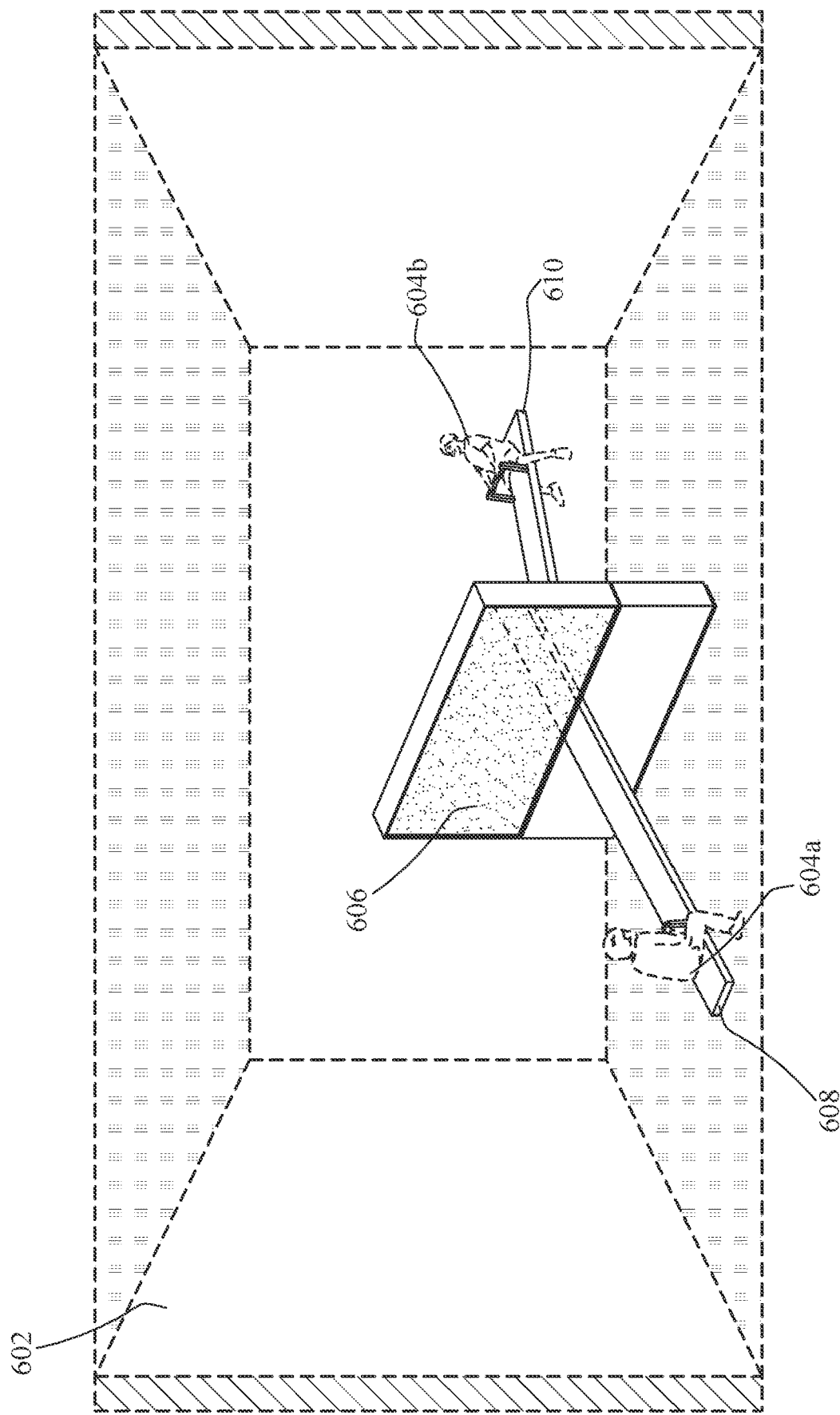
FIG. 6A is a front perspective view of an interactive shared digital seesaw in accordance with some embodiments of the present invention, for two participants at remote locations to play across a network; the shared digital seesaw including a digital screen at either end with an embedded camera to continuously capture images at each end and transmit them to the other end, with an audio component to transmit audio from each end to the other.
Figure 6B:
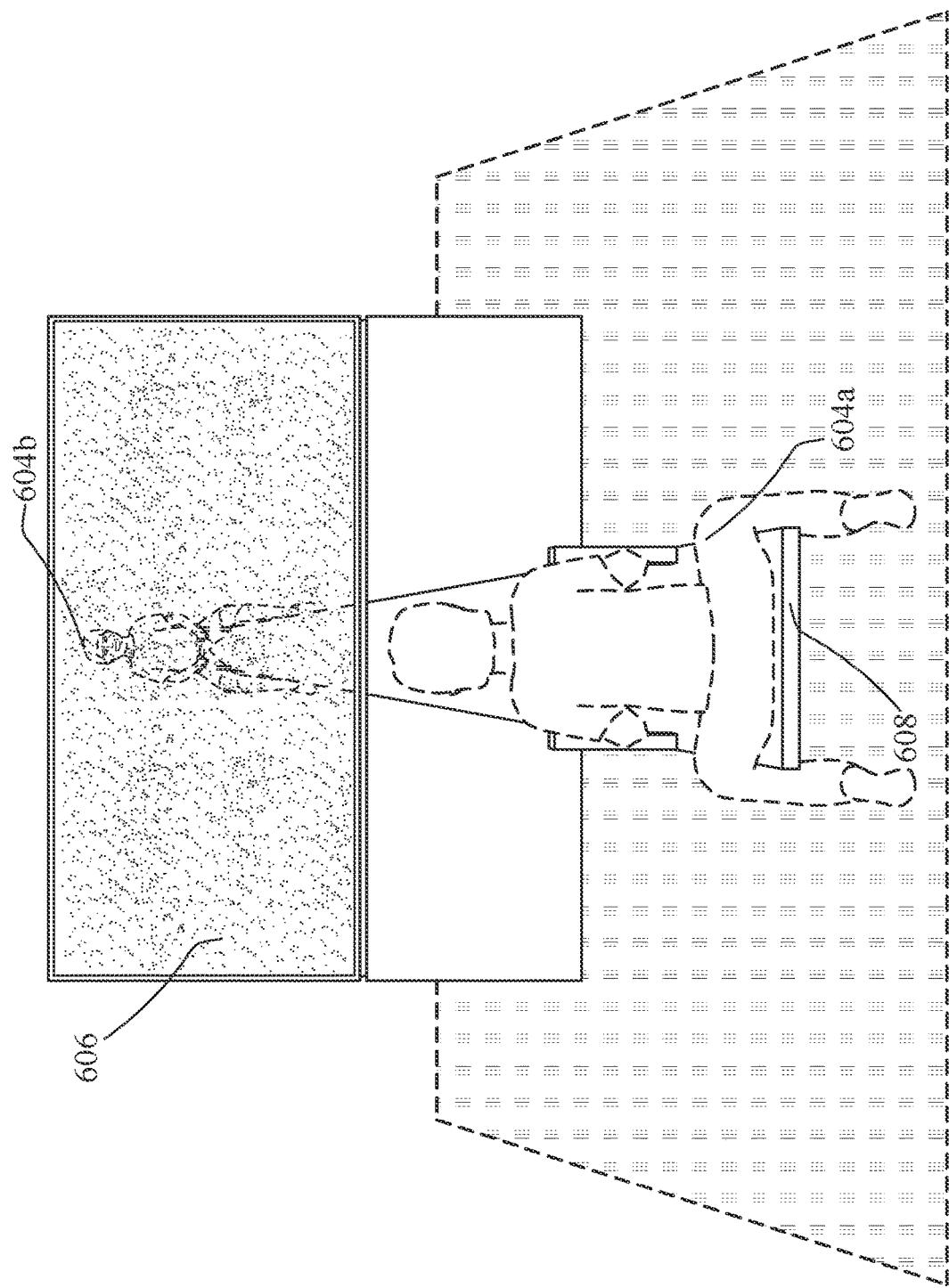
FIG. 6B is a side perspective view of the shared digital seesaw creating global motion using real-time force sensors and accelerometers, by which participants (e.g., children) in two parts of the world can lift one another up and down.
Figure 6C:
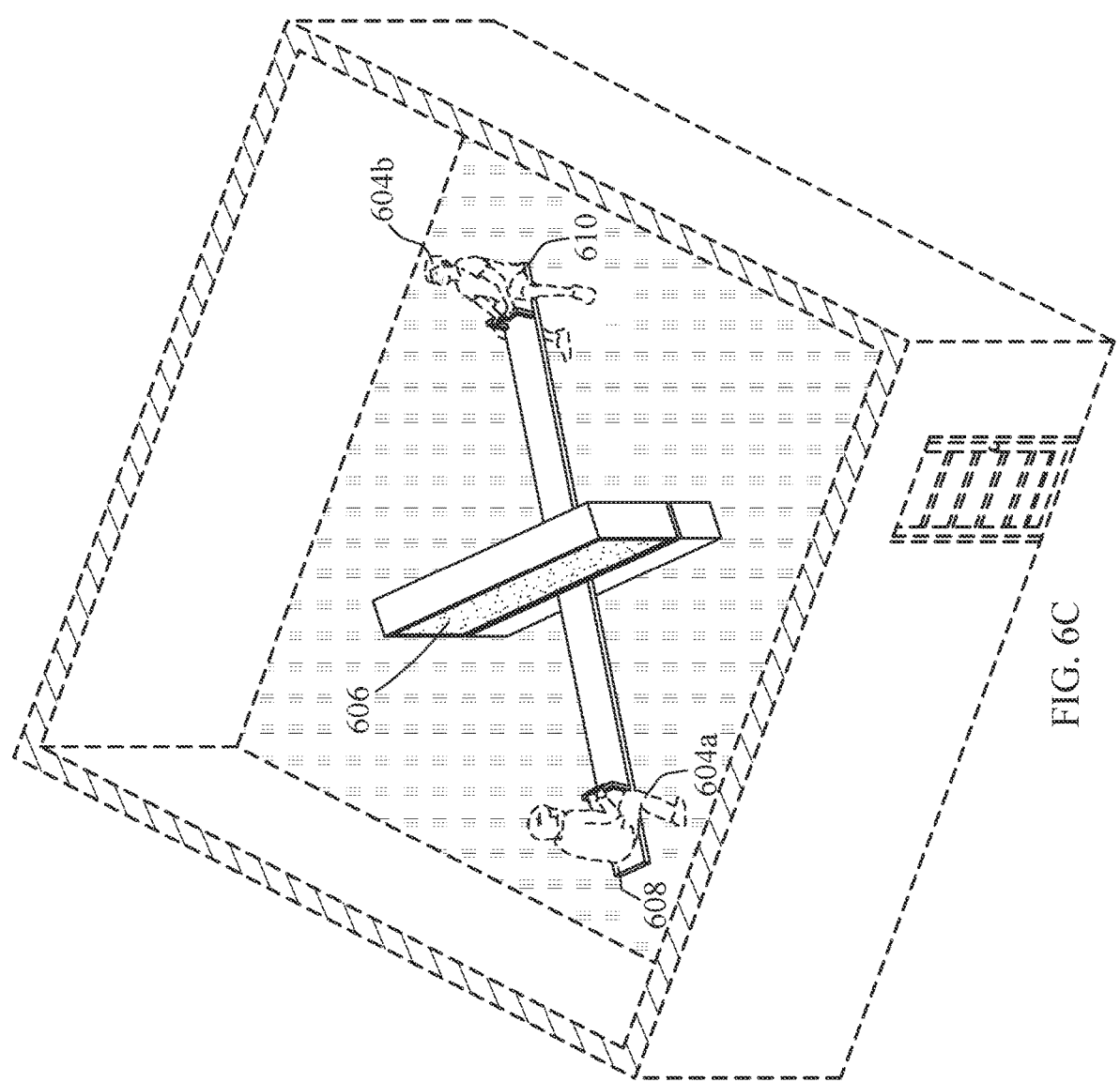
FIG. 6C is a top and side perspective view of the shared digital seesaw illustrated within a room.

FIG. 6A is a front perspective view of an interactive shared digital seesaw (two ends 608 and 610) for two participants 604a and 604b at remote locations to play across a network, each within an environment 602; the shared digital seesaw including a digital screen 606 at either end with an embedded camera to continuously capture images at each end and transmit them to the other end, with an audio component to transmit audio from each end to the other. FIG. 6B is a side perspective view of the shared digital seesaw (on either side of the display screen 606) creating global motion using real-time force sensors and accelerometers, by which participants (e.g., children 604a and 604b sitting on a part 608) in two parts of the world can lift one another up and down. FIG. 6C is a top and side perspective view of the shared digital seesaw illustrated within a room.

Figure 6D:
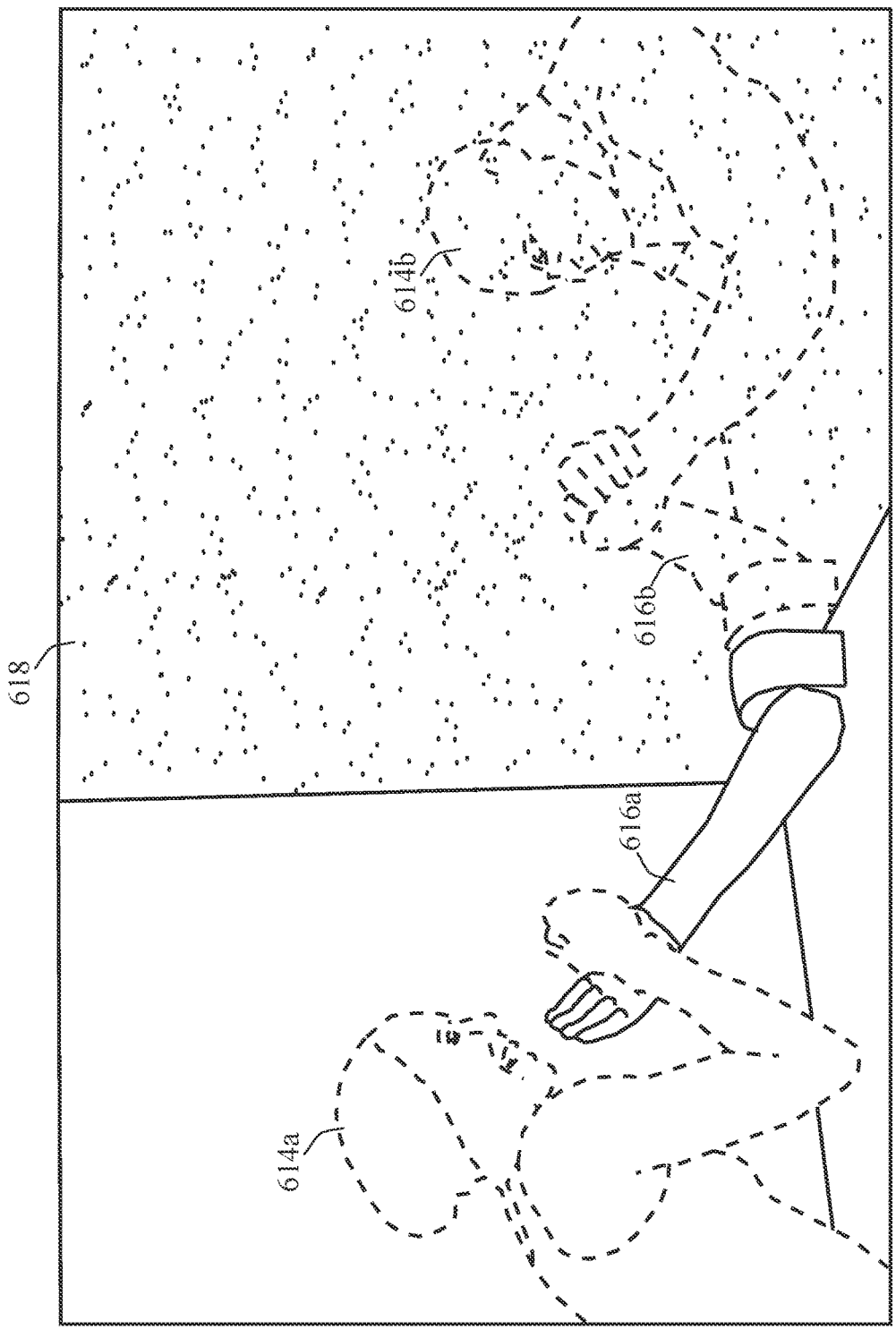
FIG. 6D is a front perspective view of an interactive shared digital arm-wrestling system in accordance with some embodiments of the present invention, for two participants at remote locations to arm-wrestle across a network; the shared digital arm-wrestling including a digital screen at either end with an embedded camera to continuously capture images at each end and transmit them to the other end, with an audio component to transmit audio from each end to the other.

FIG. 6D is a front perspective view of an interactive shared digital arm-wrestling for two participants (614a and 614b) at remote locations to arm-wrestle across a network; the shared digital arm-wrestling including a digital screen 618 at either end with an embedded camera to continuously capture images at each end and transmit them to the other end, with an audio component to transmit audio from each end to the other. Each participant's arm is engaged by a robotic arm 616a, which simulates the movements of the other participant's arm at the other end. This mechanism advantageously creates a shared-arm-wrestling experience based on shared tension where the combination of a force sensor, motor, and central-calibrating site enable a seamless experience of conveying force between distant locations.

Figure 6E:
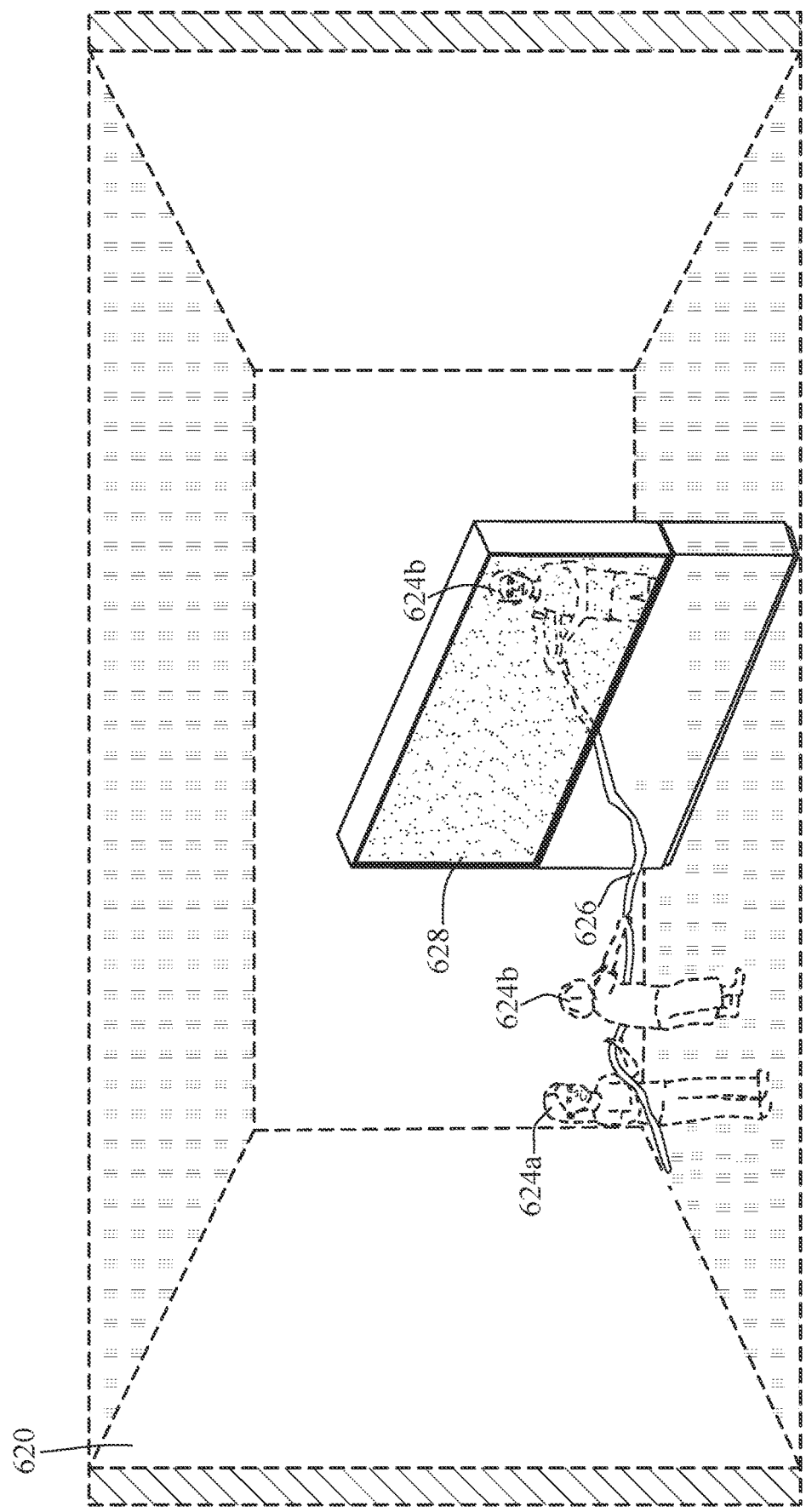
FIG. 6E is a front perspective view of an interactive shared digital tug-of-war in accordance with some embodiments of the present invention, for two or more participants at remote locations to play across a network; the shared digital tug-of-war including a digital screen at either end with an embedded camera to continuously capture images at each end and transmit them to the other end, with an audio component to transmit audio from each end to the other.

FIG. 6E is a front perspective view of an interactive shared digital tug-of-war for two or more participants 624a and 624b (624c at the other end) at remote locations to play across a network; the shared digital tug-of-war including a digital screen 628 at either end with an embedded camera to continuously capture images at each end and transmit them to the other end, with an audio component to transmit audio from each end to the other. This mechanism is used to create a shared tug-of-war game experience where the combination of a force sensor, motor, and central calibrating site enable a seamless experience of conveying force between distant locations.

Referring now to FIG. 6F, the process 600 begins at step 602, including one or more operations with executable code configured to connect display screens with first and second sides of the see-saw at the two remote locations. The process 600 proceeds to the next step 604, including one or more operations configured to initiate the sensor at each of the first and second remote locations to sense the users' weight and presence. The process 600 proceeds to the next step 606, including one or more operations configured to initiate the motion control at the second remote location to simulate movement of the first user at the first remote location. The process 600 proceeds to the next step 608, including one or more operations configured to initiate motion control at the first remote location to simulate movement of the second user at the second remote location. The process 600 proceeds to the next step 610, including one or more operations configured to regulate the movement by motion control with an algorithm that calculates the velocity based on the users' weight and their designation of desired velocity. The process 600 proceeds to the next step 612, including one or more operations configured to provide a display on a portion of either the first and second display screens to permit the users to designate the desired velocity. The process 600 proceeds to the next step 614, including one or more operations configured to continuously capture images of the user at the other end by a camera embedded in both the first and second display screens. The process 600 proceeds to the next step 616, including one or more operations configured to transmit and receive captured images from the first end to the second end to facilitate the viewing by the first and second users of each other as they move up and down. A shared-see-saw with a motor and force sensor enables participants in two different locations to control one another's experience via weight and motion, as if the participants are on the same physical-see-saw. The signals go through a central processor to ensure that issues of latency do not disturb each participants' experience and ensure safety.

Figure 7A:
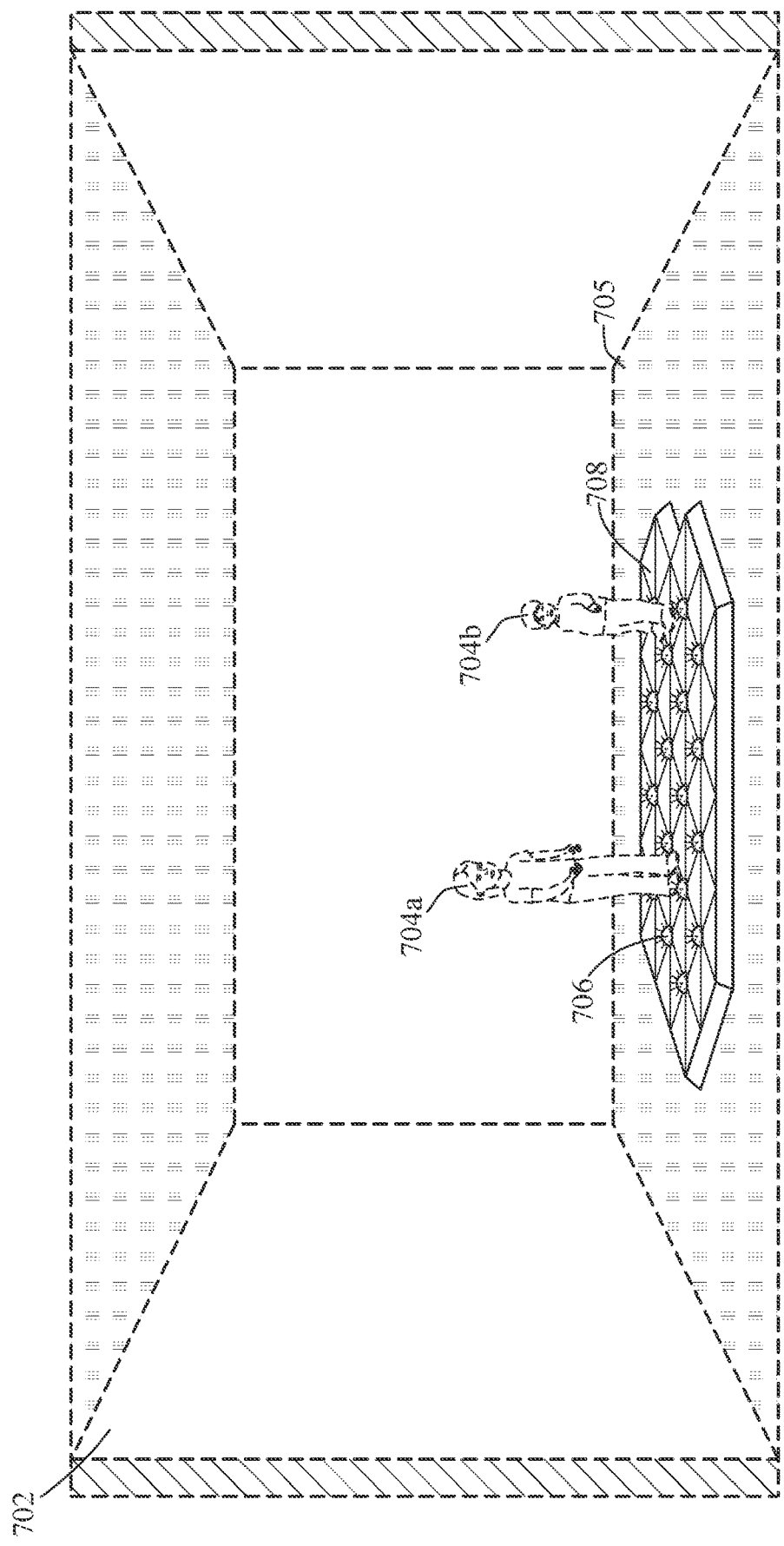
FIG. 7A is a front perspective view of an intercom including identical pads in remote locations in accordance with some embodiments of the present invention, allowing participants (e.g., children) to play on the identical pads across the world; the participants can feel the vibration of one another's steps, send light beams to new friends and speak to one another through audio components.

FIG. 7A is a front perspective view of an environment 705 containing intercom including identical pads 708 in remote locations, allowing participants 704a and 704b (e.g. children) to play on the identical pads across the world; the participants can feel the vibration of one another's steps, send light beams 706 to new friends and speak to one another through audio components.

Figure 7B:
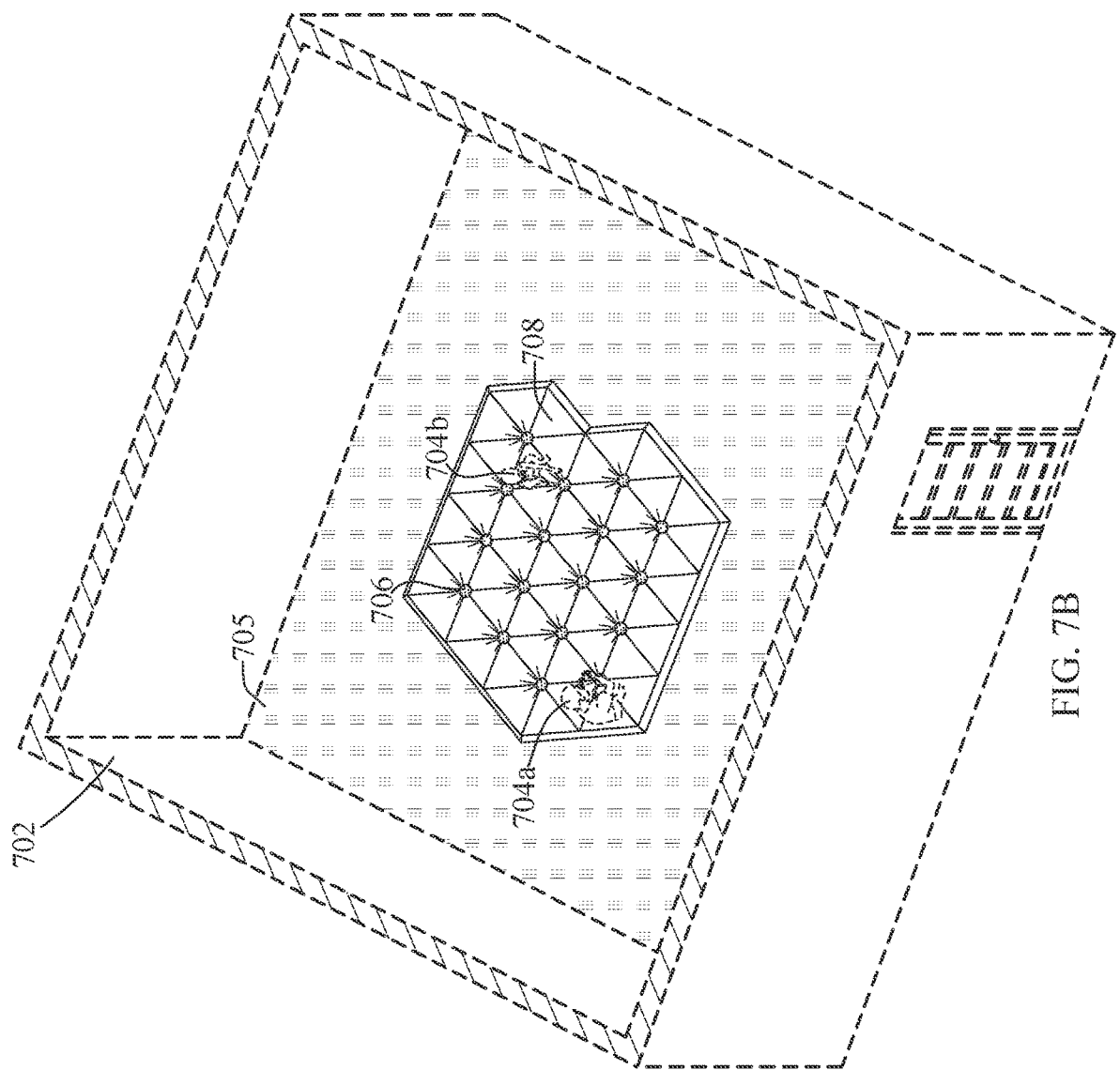
FIG. 7B is a top and side perspective view of the intercom design that facilitates feeling vibrations, for example, jumping children can feel one another's motion across the globe, the intercom design has a speaker and a microphone as part of the audio component and a light assembly and a cable-cover pad on each opening.

FIG. 7B is a top and side perspective view of the environment 702 and 705 and the intercom design that facilitates feeling vibrations. For example, jumping children 704a and 704b can feel one another's motion across the globe. The intercom design has a speaker and a microphone as part of the audio component and a light assembly 706 and a cable-cover pad 708 on each opening.

Figure 7C:
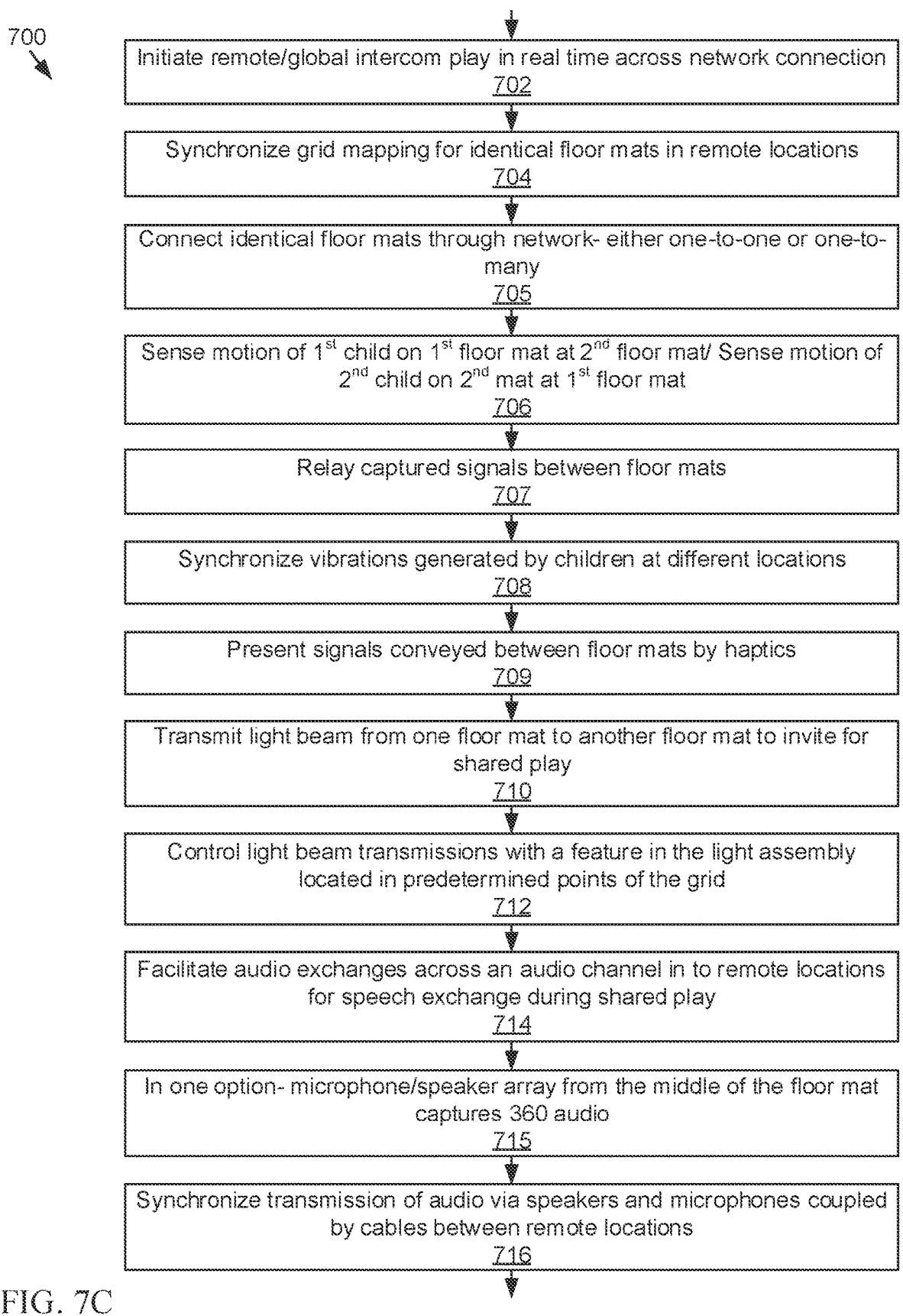
FIG. 7C is a flow chart illustrating the method for executing remote/global intercom digital play.

Referring now to FIG. 7C, the process 700 begins at step 702, including one or more operations with executable code configured to initiate remote/global intercom play in real time across a network connection. The process 700 proceeds to the next step 704, including one or more operations configured to synchronize grid mapping for identical floor mats in remote locations. The process 700 proceeds to the next step 705, including one or more operations configured to connect identical floor mats through the network, either in a one-to-one configuration or a one-to-many configuration. The process 700 proceeds to the next step 706, including one or more operations configured to sense motion of the first child on a first floor mat at a $2^{nd}$ floor and/or mat and vice versa. The process 700 proceeds to the next step 707, including one or more operations configured to relay captured signals between floor mats. The process 700 proceeds to the next step 708, including one or more operations configured to synchronize vibrations generated by children at different locations. The process 700 proceeds to the next step 709, including one or more operations configured to present signals conveyed between floor mats by haptics technology. The process 700 proceeds to the next step 710, including one or more operations configured to transmit light beam from one floor mat to another floor mat to invite shared play. The process 700 proceeds to the next step 712, including one or more operations configured to control light beam transmissions with a feature in the light assembly located in predetermined points of the grid. The process 700 proceeds to the next step 714, including one or more operations configured to facilitate audio exchanges across an audio channel to remote locations for speech exchange during shared play. The process 700 proceeds to the next step 715, including one or more operations configured to in accordance with one option, configure the microphone/speaker array from the middle of the floor mat to capture audio from 360 degrees. The process 700 proceeds to the next step 716, including one or more operations configured to synchronize transmission of audio via speakers and microphones coupled by cables between remote locations.

Figure 8A:
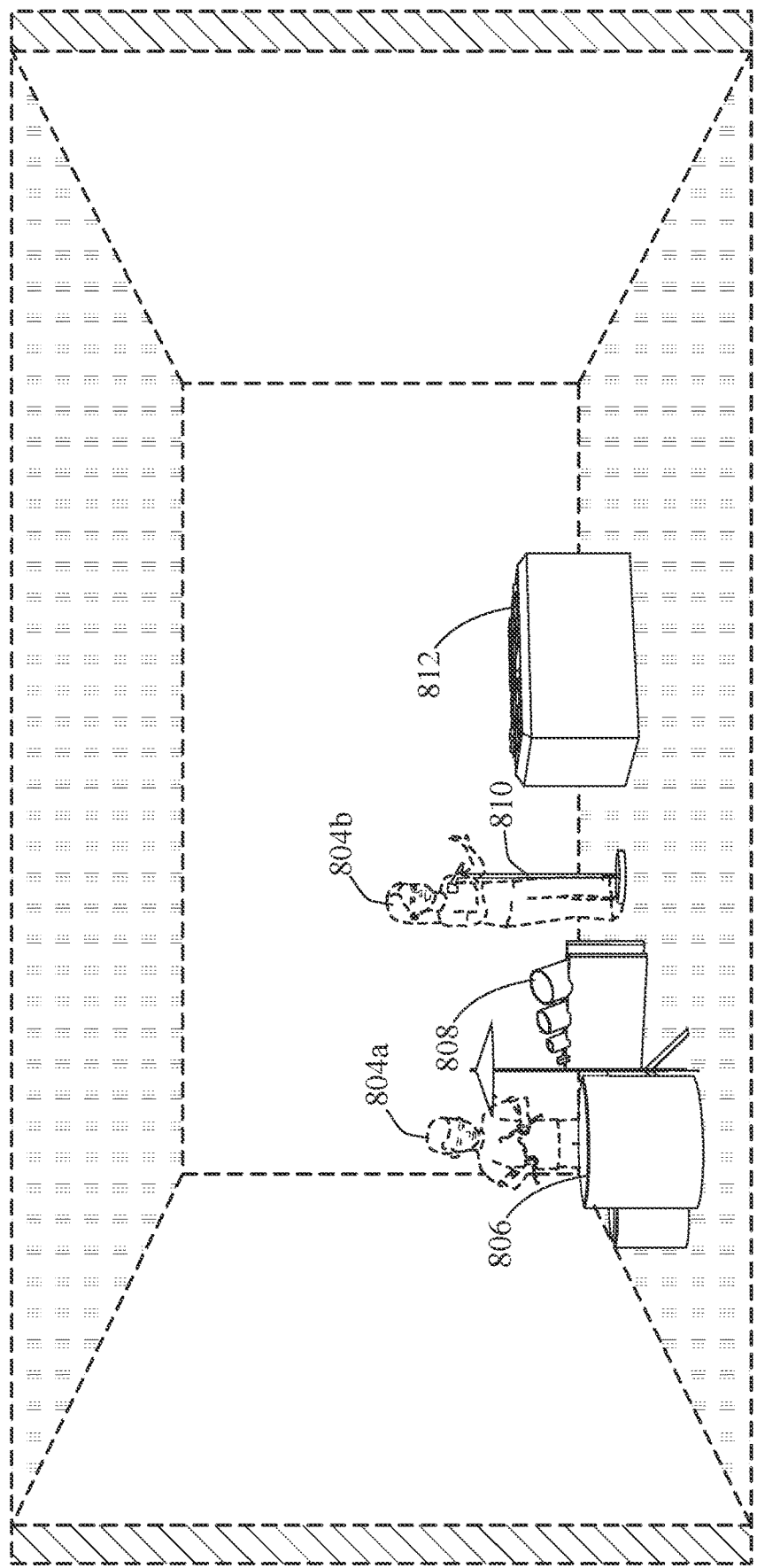
FIG. 8A is a front perspective view of digital sounds in accordance with some embodiments of the present invention, to allow participants (e.g., children) across the world to make music together, live and in real time across a network, using four instrument sets, including drums, vocals, turntables, and chimes; digital sounds include a digital screen at each remote collaborating location with an embedded camera and audio component.

FIG. 8A is a front perspective view of digital sounds to allow participants 804a and 804b (e.g., children) across the world to make music together, live and in real time across a network, using four instrument sets, including drums 806, vocals 810, turntables 812, and chimes 808; digital sounds include a digital screen at each remote collaborating location with an embedded camera and audio component.

Figure 8B:
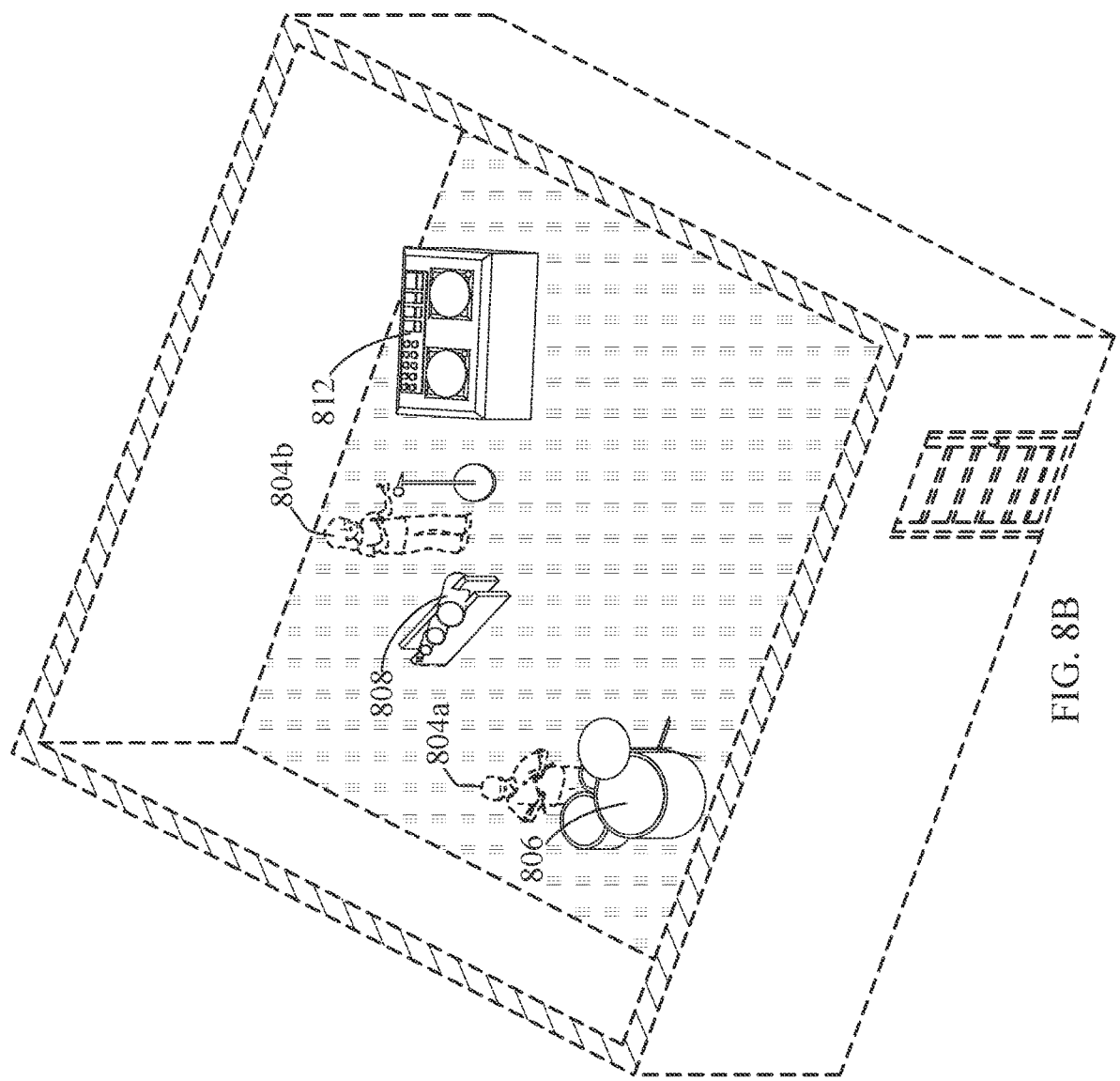
FIG. 8B is a top perspective view of digital sounds including drums, vocals, turntables, and chimes, to create a global jam; each electronic instrument equipped with interactive components that, when activated, produce sounds that are automatically synchronized to the collaborating location.

FIG. 8B is a top perspective view of digital sounds including drums 806, vocals 810, turntables 812, and chimes 808, to create a global jam; each electronic instrument equipped with interactive components that, when activated, produce sounds that are automatically synchronized to the collaborating location.

Figure 8C:
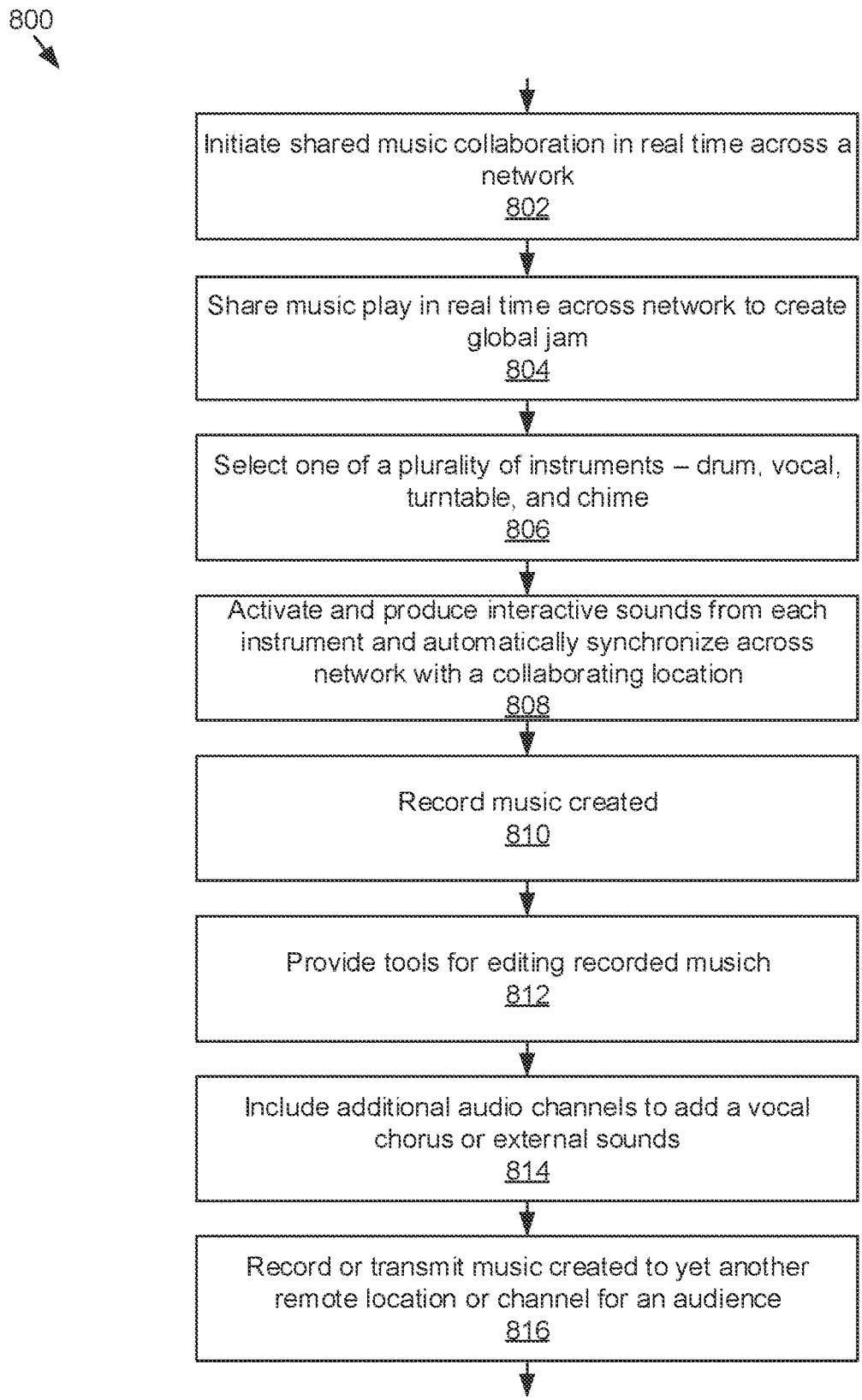
FIG. 8C is a flow chart illustrating a method for executing shared music collaboration.

Referring now to FIG. 8C, the process 800 begins at step 802, including one or more operations with executable code configured to initiate shared music collaboration in real time across a network. The process 800 proceeds to the next step 804, including one or more operations configured to share music play in real time across the network to create a global jam. The process 800 proceeds to the next step 806, including one or more operations configured to select one of a plurality of instruments (e.g., drum, vocal, turntable, chimes or other instruments). The process 800 proceeds to the next step 808, including one or more operations configured to activate and produce interactive sounds from each instrument and automatically synchronize across the network with a collaborating location. The process 800 proceeds to the next step 810, including one or more operations configured to record the music created. The process 800 proceeds to the next step 812, including one or more operations configured to provide tools for editing recorded music. The process 800 proceeds to the next step 814, including one or more operations configured to include additional audio channels to add a vocal chorus or external sounds. The process 800 proceeds to the next step 816, including one or more operations configured to record or transmit music created to yet another remote location or channel for an audience.

Figure 9A:
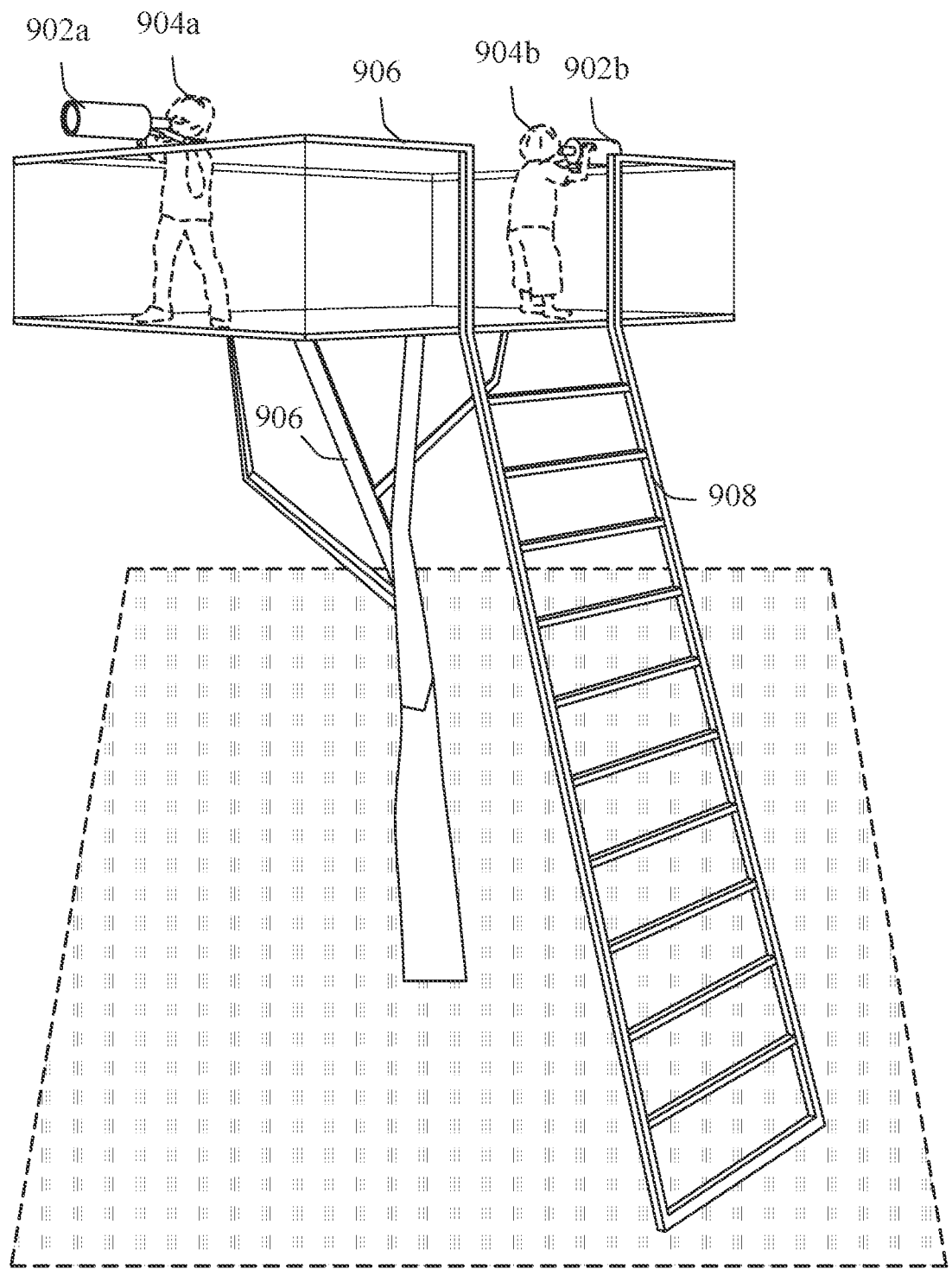
FIG. 9A is a front perspective view of an interactive lookout design in accordance with some embodiments of the present invention, by which participants (e.g., children) can scale a ladder or climb a wall and reach the tree-tops; and through telescopes located in the lookout, the participants can explore on the other side of the world.

FIG. 9A is a front perspective view of an interactive lookout design, by which participants 904a and 904b (e.g., children) can scale a ladder 908 or climb a wall and reach the tree-tops; and through telescopes 902a and 902b (at the other end of a communication network 102) located in the lookout 906, the participants can explore on the other side of the world.

Figure 9B:
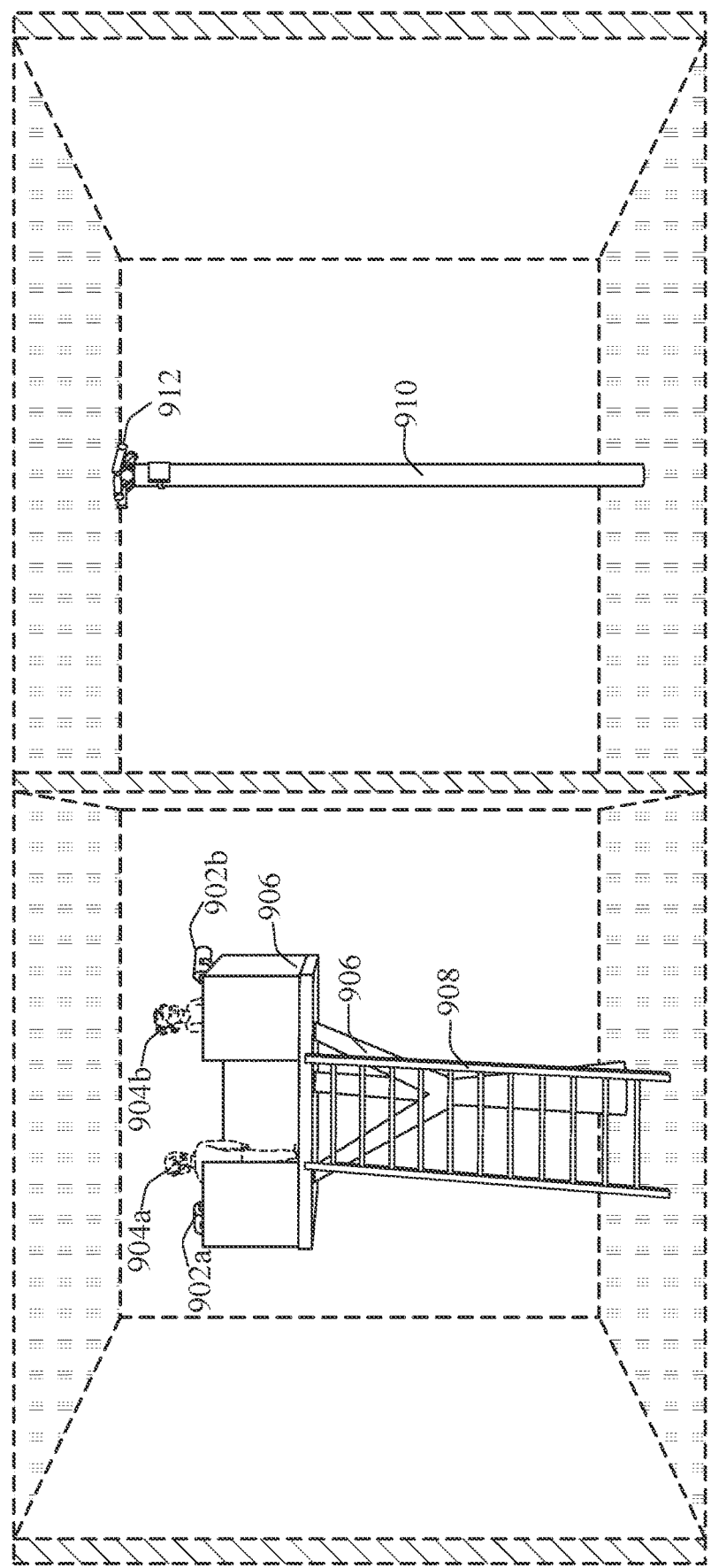
FIG. 9B is a front perspective view of one embodiment of the interactive lookout design at one end with 3D cameras located in three corners to facilitate 3D exploration; the participants control movement of the remote 3D cameras to capture high-resolution, live images; the lookout design including a steel structure and elevated platform and a glass railing; at the other end, the lookout design including a remote camera pole.

FIG. 9B is a front perspective view of one embodiment of the interactive lookout design 906 at one end with 3D cameras 912 located in three corners to facilitate 3D exploration; the participants 904a and 904b control movement of the remote 3D cameras 912 to capture high-resolution, live images; the lookout design including a steel structure and elevated platform and a glass railing; at the other end, the lookout design including a remote camera pole 910.

Figure 9C:
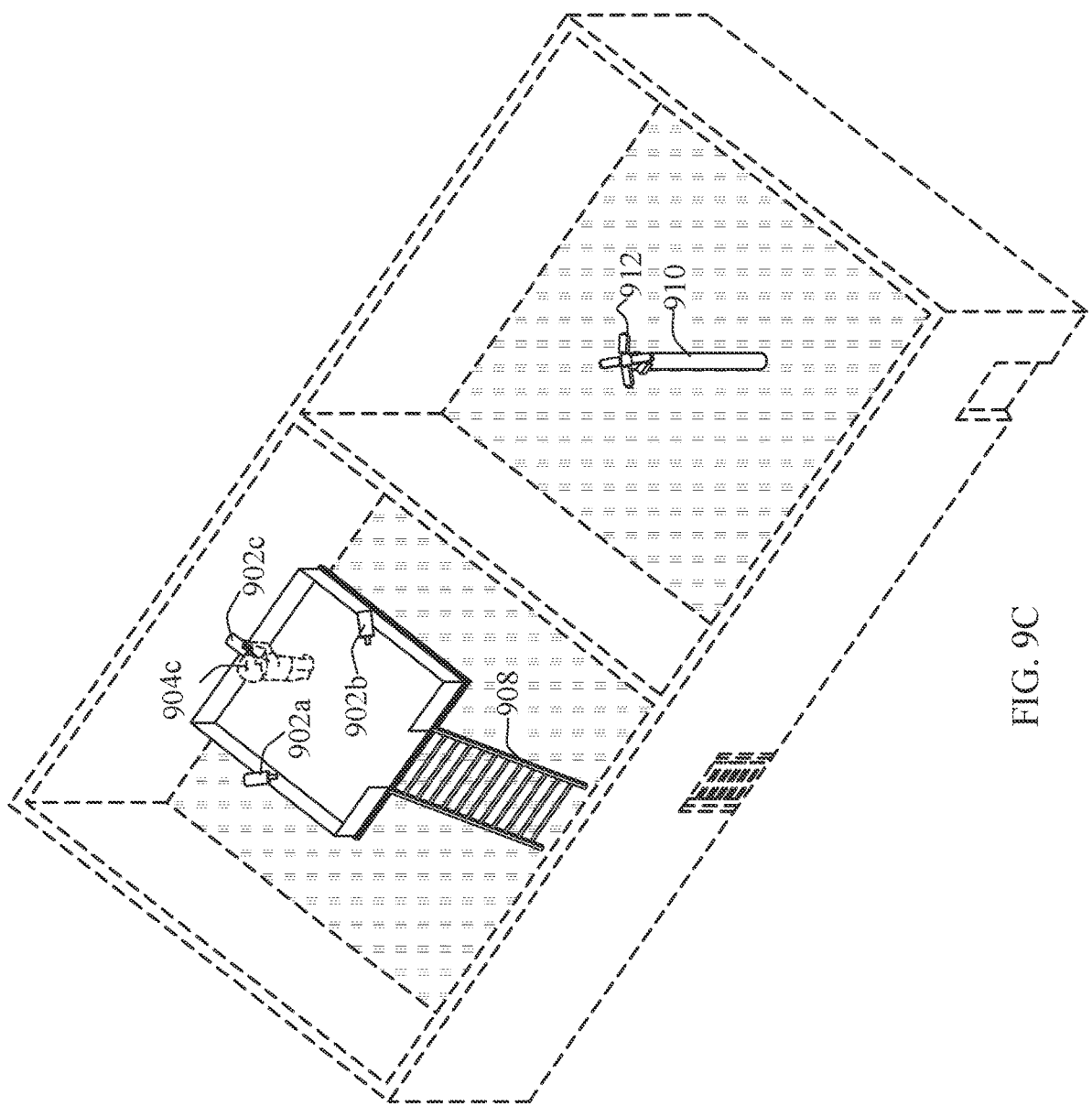
FIG. 9C is a top perspective view of the lookout design in FIG. 6B.
Figure 9D:
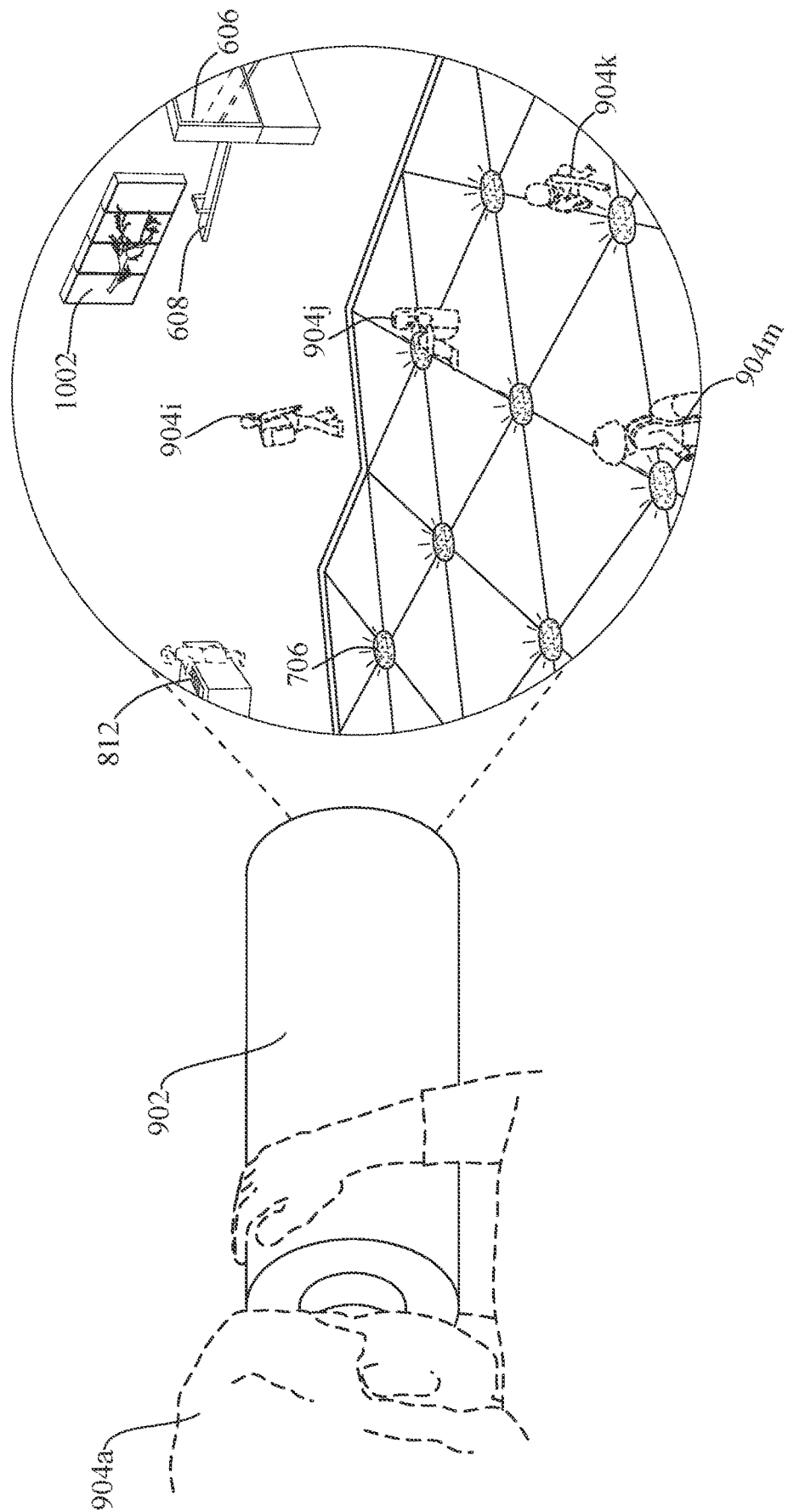
FIG. 9D is a perspective view illustrating a telescope in real-time engagement with a remote playground location (e.g., intercom digital pad), illustrating a child peering through one lookout telescope to view a shared playground and its surrounding environment in the other side of the world.

FIG. 9C is a top perspective view of the lookout design 906 illustrated in FIG. 9B. FIG. 9D is a perspective view illustrating a telescope 902a, 902b, and 902c in real-time engagement with a remote playground location (e.g., intercom digital pad), illustrating a child 904c peering through one lookout telescope 902a, 902b, 902c to view a shared playground and its surrounding environment in the other side of the world.

Figure 9E:
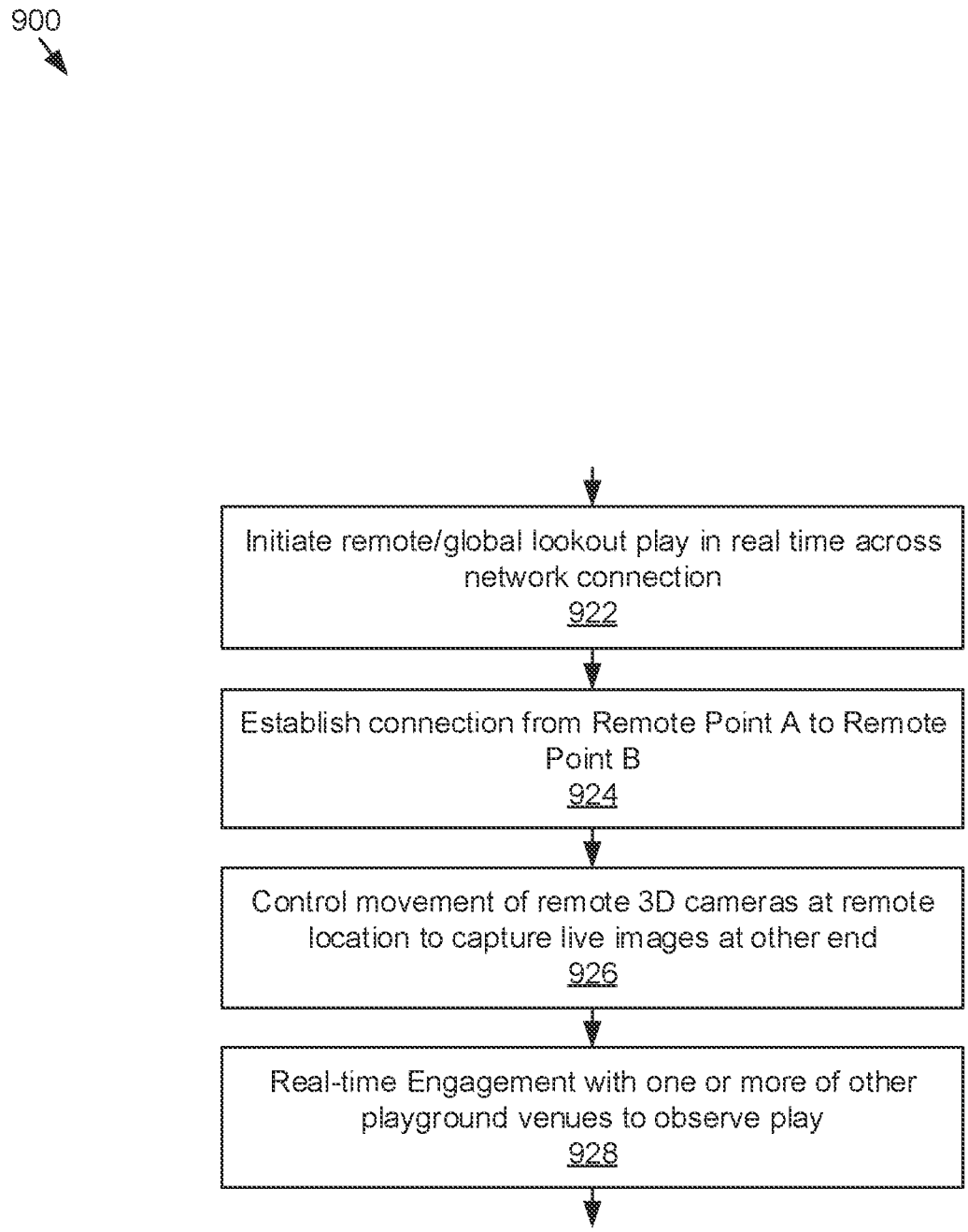
FIG. 9E is a flow chart illustrating lookout play in accordance with one embodiment of the present inventions.

Referring now to FIG. 9E, the process 900 begins and proceeds to step 922, including one or more operations configured to initiate remote/global lookout play in real time across a network connection. The process 900 proceeds to the next step 924, including one or more operations configured to establish connection from remote point A to remote point B. The process 900 proceeds to step 926, including one or more operations configured to control movement of remote 3D cameras at remote locations to capture live images at the other end. The process 900 proceeds to the next step 928, including one or more operations configured to real-time engagement with one or more of the other playground venues to observe play.

Figure 10:
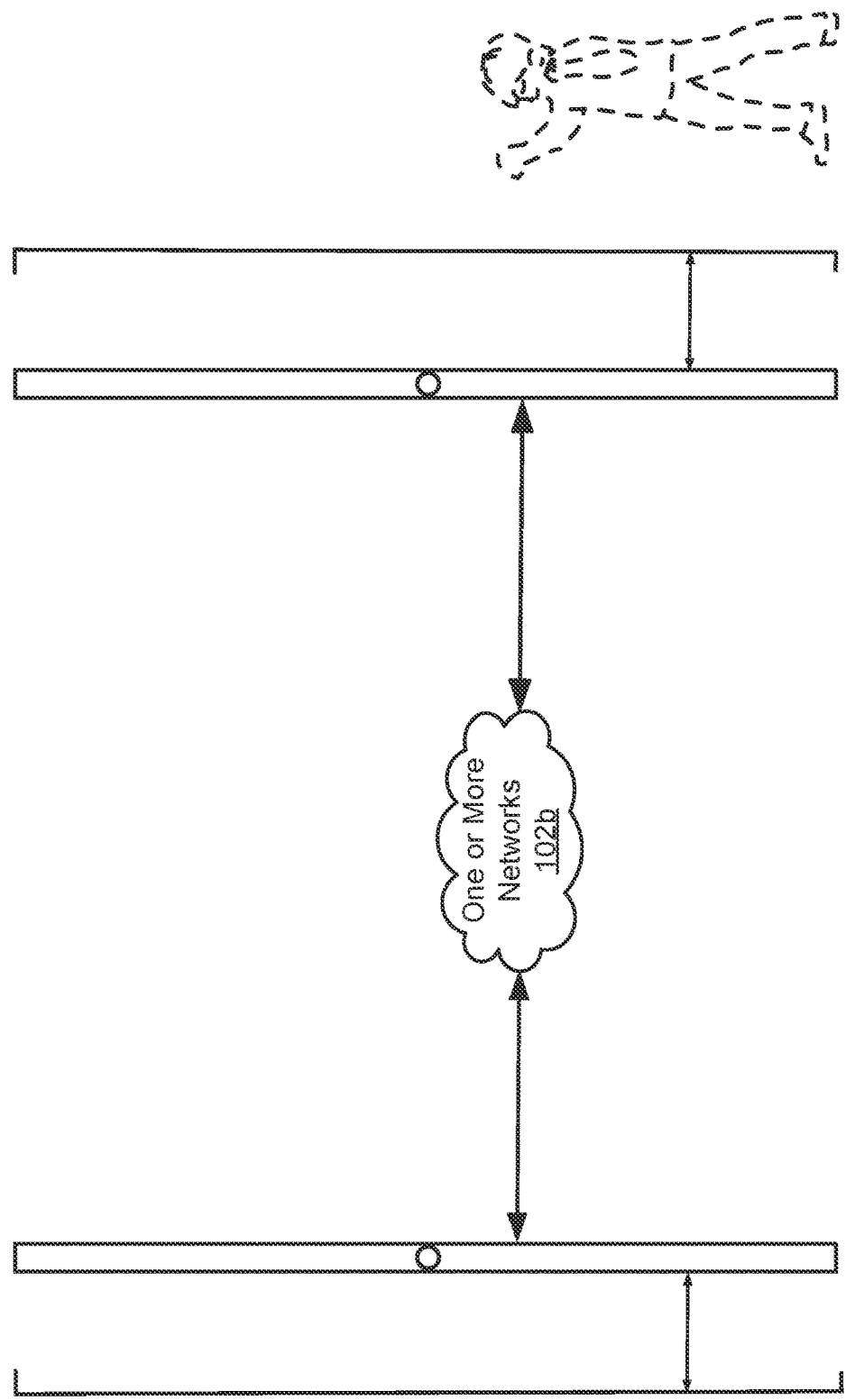
FIG. 10 is an illustration of digital screens at remote ends connecting through one or more networks for creating a distributed playground environment.

Referring now to FIG. 10, the two screens are illustrated at remote ends connected by any configuration of networks that currently exist in the communication framework in the world.

Referring again to FIG. 9E, these lookout embodiments are implemented by various technologies to create a shared vision. Shared vision is created and executed by using a headpiece in one location and connecting it to a live camera on a motor in another location via a network. The motor is configured to permit 360-degree motion, including looking up and down. A viewer places his or her eyes in the headpiece and by moving the headpiece around, moves the camera on the motor in the other location. This creates the feeling of actually "peering" through the Internet at another location (near or a world away). Unlike using a joystick as in most gaming systems, this technique mirrors a normal experience one has with a binocular or monocular, which is a more natural gesture. An advantage of this over other methods is twofold. Unlike using a joystick, this is more natural in its feeling. And unlike using a 360 headset to look around a live 360 image, this allows for better image quality because only the field of view currently in the remote viewers line of site needs to be conveyed from the distant location.

In one embodiment, the person with the headset in the remote location can live-stream his or her view to others. This is useful, for example, for a teacher giving a live tour of the Amazon to his or her class, or birdwatching. This is also useful in other scenarios, for example, for someone overseeing a construction site to share his or her concerns with colleagues. In yet another embodiment, control over the remote camera can be switched from one headset to another so that a different person can lead the virtual tour, with other headsets "pegged" to the control headset.

In one specific embodiment, two or more cameras are used for 3D effects, image calibration, or to create an effect of "peering" around a corner.

The disclosed inventions in some embodiments (e.g., intercom structures) create a shared floor. The motion of participants on one "mat" or digital pad are caught by sensors that relay the signal to a remote location. The other mat presents these signals by haptics technologies known to those skilled in the art. Each mat is connected to one other across one or more networks (e.g. internet), and the person jumping on one mat or digital pad feels the vibrations of the person jumping on the other. In one embodiment, a microphone and speaker array are configured to emerge up from the middle of the mat or digital pad and captures and presents 360 audio surround sound. This enables people on one side of the mat or digital pad to feel, hear, and speak to someone at the other mat, and also be able to tell the relative position of that person on the other mat.

This particular embodiment may be used for many things. For example, a yoga teacher could stretch on one mat and apply pressure to the floor, which someone on a tethered distant mat may use to determine where to place body parts and hold. Or people having a dance party could work to apply force to the same part of the mat or digital pad at the same time.

In accordance with one embodiment, a single mat or digital pad may take the lead and "present" to other mats located all over the world, each connected to the lead and others across networks. This may be useful for global movement lessons issuing from one source to all others. In another embodiment, pairs of mats are connected just to one another. This can be used in group games.

In another embodiment, in addition to haptics and sound, there is light that is configured to flash from each digital panel in the mat. The mat or digital pad comprises many smaller tiles, as many as desired.

In yet other embodiments, shared music is created. Children hitting or striking physical instruments are given the experience of hitting analog instruments (e.g. a physical chime that vibrates or drum that vibrates) but the signal that is captured and conveyed is purely digital. A sound is issued both locally and at a distant location (duplicate signals are transmitted locally and remotely). The digital sound is transmitted through a central coordinating hub, which synchronizes the digital sound around the world, correcting for latency, and re-presents that sound at connected locations. This allows, for example, drummers in five countries to drum simultaneously, or alternatively, pianists, or guitarists, or one of each. This may be used for fun or for professional collaboration or even recording.

The present inventions embodied in the various example illustrations herein create a novel graphical interface (e.g., created by user interface module 204, FIGS. 3A and 3B). Each playground structure or component (or shared space) has a user interface where each element can select which other element in the global network to connect to (it sees "availability" and "time zone" and whether there is a person on the other end using a "motion" sensor). This is to ensure someone doesn't turn on the seesaw with no one on the other side. These metrics of "availability" etc., may be included in a user or central (by location) dashboard. There is automated or "user-defined" methods of deciding where to connect and when. Automation may be based on and effected by motion and time of day and user-preferences. In some embodiments, the system has a physical location designation and control panel plus a cloud coordination mechanism. The cloud coordinates signals but can also capture material and store it (for example, music, force, or images). In addition, each piece may be placed together, or taken piece by piece. End users have an ability to organize the layout of the playground in a virtual environment and have elements interact or not (screens interacting with the music, and if people buy both, it does something else)

In some embodiments, a smartphone s used as a camera and computer. A smartphone device, such as an iPhone is placed at eye level on a wall, on a screen, or similar location. An iPhone device may be affixed to a way in a variety of ways, with designs for affixing the iPhone in or on the wall, including in a fold-out compartment that also charges the iPhone.

The digital signals are conveyed to the project, speaker, and microphone array via.

Wifi, Bluetooth, or via cords attaching to the wall mount.

The smartphone with camera becomes a mobile playground portal that is carried and introducing a capability to tuna any all in to a communication hub or portal. This type of arrangement is particularly useful for business travelers going to hotel rooms and wanting to reconnect with their home. Projectors may be conveniently used as they getting smaller and smaller. In accordance with one embodiment, two or more cameras are used for 3D effects or image calibration In some embodiments, a strip with camera, microphone, and sensor is created. This is accomplished by embedding these following components in a thin strip that rests between bezels in LCD or LED video walls, in place of removed LED pixels, on or in walls, or on top of a screen that includes: camera, microphone, sensors (heat, motion, infrared or any other sensing technology that is known to one skilled in the art). The strip is configured have access to power via a thin power cable. The rest is transmitted wirelessly, or if desired, by wire, to a transmitter and receiver.

That transmitter and receiver can connect to the Internet live to stream or connect live to identical strips around the world allowing for presentation, videoconferencing, or multiplexing. In one specific embodiment, two or more cameras are used for 3D effects or image calibration In another embodiment, hundreds of cameras can stretch around the screen on the periphery to stitch together an image. This allows participants to get close to the camera while still being able to capture them life size.

The present inventions create a shared playground or component display control as illustrated above. The component display control may also be referred to as a portal display control. As indicated above, the present inventions are embodied in the various shared playground structures and components described above. These are configured with the referenced technologies. A reference to a haptic device includes a manipulator with sensors, actuators, or both. A variety of haptic devices are developed for the purposes illustrated here. These may be tactile—based, pen-based, and 3 degree-of-freedom (DOF) force feedback devices. A haptic interface consists of a haptic device and software-based computer control mechanisms that enable human—machine communication through the sense of touch. By using a haptic interface, humans not only feed the information to the computer but can also receive information or feedback from the computer in the form of a physical sensation on some parts of the body. In some instances, tele-haptics may be used for transmitting haptic sensations from a remote explored object/environment, using a network such as the Internet, to a human operator. In other words, it is an extension of human touching sensation/capability beyond physical distance limits. In some instances, contact detection may be used for detecting contact between the virtual objects and the haptic device (a PHANTOM, a glove, etc.). Once this contact is reliably detected, a force corresponding to the interaction physics is generated and rendered using the probe. This process usually runs in a tight servo loop within a haptic rendering system. In some instances, capture, storage, and retrieval of haptic data is accomplished using optimal methods for the description, storage, and retrieval of moving-sensor data of the type generated by haptic devices. This technique captures the hand or finger movement of an expert performing a skilled movement and "play it back," so that a novice can retrace the expert's path, with realistic touch sensation; The INSITE system is capable of providing instantaneous comparison of two users with respect to duration, speed, acceleration, and thumb and finger forces. In some instances, haptic data-compression is used, by which data about the user's interaction with objects in the virtual environment is continually refreshed if they are manipulated or deformed by user input. If data are too bulky relative to available bandwidth and computational resources, there will be improper registration between what the user sees on screen and what he/she "feels." On analyzing data obtained experimentally from the PHANTOM and the Cyber Grasp, exploring compression techniques, starting with simple approaches (similar to those used in speech coding) and continuing with methods that are more specific to the haptic data. One of two lossy methods to compress the data may be employed: One approach is to use a lower sampling rate; the other is to note small changes during movement. In some instances, multimedia haptics may be required in a virtual environment such as created by these shared playground structures. A real scenario is simulated by a computer-generated application where some of the user's senses are ingeniously represented in order for them to interact and perceive stimuli that are very similar to the real environment. Traditionally, human—computer interfaces have delivered types of stimuli that are based on two of our senses, namely vision and sound. However, with the addition of the sense of touch through tactile and force feedback, the computer-based applications become richer in media content through better mimicry of real-life situations and tasks or remote real environments. The sensing of forces is tightly coupled with both the visual system and one's spatial sense; the eyes and hands work collectively to explore and manipulate objects. Moreover, haptic modality reduces the perceived musculoskeletal loading that is measured through pain and discomfort in completing a task. The design of interfaces involves multimodal human—computer interaction that incorporates the sense of touch. However, the keyword here is "perception", so if the cross-modal information is not well synchronized and consistent, the added sensory information might corrupt the intended stimulus. For instance, when conflict between sensory cues (for instance, between the hands and eyes) arise, the brain effectively splits the difference to produce a single mental image, and the overall perception experienced by the subject will be a compromise between the two senses. Therefore, visual cues are synchronized with haptic interactions to increase the quality of perception.

The various playground structures may be constructed by machine haptics involving designing, constructing, and developing mechanical devices that replace or augment human touch. These devices are put into physical contact with the human body for the purpose of exchanging (measuring and displaying) information with the human nervous system. In general, haptic interfaces have two basic functions. First, they measure the positions or contact forces of any part of the human body, and second, they compute the information and display the position or forces in appropriate spatial and temporal coordination to the user. Currently, most of the force-feedback haptic interfaces sense the position of their end-effector and display the forces to the user using single point of interaction models.

To create the software, computer haptics is used to develop specific algorithms and software to generate and render the "touch" of virtual environments and objects, just as computer graphics deal with generating and rendering visual images. Computer haptics has two main components, haptic rendering and visual rendering, that communicate the virtual environment's graphics, sound, and force responses to the human user. Haptic rendering represents the core of the haptic-based applications—it manages algorithms to detect and report when and where the geometry contact has occurred (collision detection) and computes the correct interaction force between a haptic device and its virtual environment (collision response). Visual rendering integrates a number of algorithms and techniques to compute the real-time behavior of the virtual environment's graphics using mathematical expressions or any other modeling techniques.

Multimedia and information technology are reaching limits in terms of what can be done in multimedia applications with only sight and sound. The next critical step in development in multimedia systems is to bring the sense of "touch" into applications. Multimedia haptics is defined as the acquisition of spatial, temporal, and physical knowledge of the environment through the human touch sensory system and the integration/coordination of this knowledge with other sensory displays (such as audio, video, and text) in a multimedia system. Therefore, multi-media haptics, which we also refer to as a haptic audio-visual environment (HAVE), involves integrating and coordinating the presentation of haptic interface data, and other types of media, in the multimedia application to utilize gesture recognition, tactile sensing, and force feedback.

To create an architecture of collaborative haptic audio-visual environment, haptic rendering comprises a group of algorithms and techniques that compute and generate interaction forces and torques between the haptic interface avatar (the image of a person in virtual reality) and the virtual objects populating the environment. The simulation engine is responsible for computing the virtual environment behavior over time. The visual and auditory modalities have their own rendering algorithms and transducers that convert media signals from the virtual environment into a form the human operator can perceive. The network interface module connects the local haptic system to the collaborative networked environment while facilitating the use of haptics in a network context. This is commonly referred to as tele-haptics. It involves transmitting computer-generated touch sensations over networks between physically distant humans. It should be recognized by those skilled in the art that the principle of haptic interaction is simple. When a human user manipulates a generic probe (end-effector) of the haptic interface device, the position sensors implanted on the device convey its tip position to the computer. The position of the end—effector correlates with the avatar and updates it accordingly. Every time interval (i.e., 1 ms), the computer that controls the device checks for collisions between the end-effector (simulated stylus) and the virtual objects that populate the virtual environment. If a collision has occurred, the haptic rendering system calculates the reaction forces/torques that should occur at the interaction point and commands the actuators (typically a computer-controlled electric dc motor) that are attached to the device to move, thus leading to tactual perception of the virtual objects. If no collision is detected, no forces will be computed and applied and the user is free to move the haptic device as if exploring an empty space. Typically, the magnitudes of the reaction forces are assumed proportional to the depth of indentation and the forces are applied along the exterior of the surface being penetrated.

Haptic interfaces or devices are essentially small robots that exchange mechanical energy with users. From a hardware perspective, a haptic device has one or more input transducers (sensors that measure the positions and/or contact forces of any part of the human body) and at least one output transducer (actuator that displays contact forces and positions in appropriate spatial and temporal coordination to the user).

Two major features characterize haptic devices, namely, the degree of freedom and the haptic refresh rate. The degree of freedom refers to the number of independent axes down or around which the device can exert force or torque. Available devices range from those capable of producing nondirectional forces, such as vibrations, to 6-degree-of-freedom devices that can activate forces along and around all three spatial axes. On the other hand, the haptic refresh rate represents the maximum speed at which the device hardware can generate forces or torques to the user. It has been shown that at least 1 kHz is required (which is a typical value for state-of-the-art devices) to create a smooth illusion of haptic interaction.

It should be recognized by those skilled in the art that haptic rendering refers to the group of algorithms and techniques that are used to compute and generate forces and torques in response to interactions between the haptic interface avatar inside the virtual environment and the virtual objects populating the environment. First, the avatar is a virtual representation of the haptic interface whose position is controlled by the operator. Second, the interaction between avatars and virtual objects is bidirectional; the energy and information flow both from and toward the user. The avatar's geometry and type of contact varies according to the application and can be point-based, multipoint-based, or volumetric objects, consequently regulating the generated forces. Third, the ability to find the point(s) of contact is at the core of the haptic rendering process: this is the problem of collision detection, which becomes more difficult and computationally expensive as the complexity of the models increases. Fourth, calculating the ideal contact forces is referred to as a force response algorithm: after detecting a collision, the interaction forces between avatars and virtual objects must be computed. These computed forces then generate tactile or kinesthetic sensations. Fifth, the generation of the contact forces is an integral part of the haptic rendering package, which creates the "feel" of the object. The haptic device is commanded in such a way that minimizes the error between ideal and applicable forces. The generated force can represent the stiffness of the object, damping, friction, surface texture, etc. Finally, all the above-mentioned algorithms must repeat the computations at a rate equal to or higher than 1 kHz, and latency must be low. Inappropriate values of these variables might result in system instabilities.

In some embodiments of the playground structures created, these inventions may use a VR360' video player with haptic feedback playback. The VR360HD application enhances VR viewing experience by triggering customized haptic effects associated with the user's activities, biofeedback, network messages and customizable timeline triggers incorporated in the VR media. The application is developed in the Unity 3D game engine and tested using a GearVR headset, therefore allowing users to add animations to VR gameplay and to the VR360° streams. A custom haptic plugin allows users to at and associate animated haptic effects to the triggers, and playback these effects on a custom haptic hardware, the Haptic Chair. We show that the VR360HD app creates rich tactile effects and can be easily adapted to other media types.

In some embodiments, these inventions may use AIREAL, a novel haptic technology that delivers effective and expressive tactile sensations in free air, without requiring the user to wear a physical device.

AIREAL is a novel haptic technology that delivers effective and expressive tactile sensations in free air, without requiring the user to wear a physical device. Combined with interactive computers graphics, AIREAL enables users to feel virtual 3D objects, experience free air textures and receive haptic feedback on gestures performed in free space. AIREAL relies on air vortex generation directed by an actuated flexible nozzle to provide effective tactile feedback with a 75 degrees field of view, and within an 8.5 cm resolution at 1 meter. AIREAL is a scalable, inexpensive and practical free air haptic technology that can be used in a broad range of applications, including gaming, mobile applications, and gesture interaction among many others.

In accordance with one application, a lecturer is calling on numerous student groups to answer questions after delivering a lecture to 1000 sites live. The playground/portal display control is configured in various ways. In some embodiments, it can be voice activated. In other embodiments, it may call by selecting a physical image. In yet other embodiments, it may be activated by gestural interactions like raising a hand to request speaking lights. It may be configured for a teacher to sequence questioners. The playground/portal display control has different settings for a single speaker, multiple speakers, being able to select a particular person; an enterprise meeting with all offices etc.

It should be recognized that the different components and elements that are used to create the immersive experiences are coupled my one or more networks. The networks may be a conventional type, wired or wireless, and may have numerous different configurations including a star configuration, token ring configuration or other configurations. Furthermore, each network used may include a local area network (LAN), a wide area network (WAN) (e.g., the Internet), and/or other interconnected data paths across which multiple devices may communicate. In some embodiments, the network may be a peer-to-peer network. The network may also be coupled to or include portions of a telecommunications network for sending data in a variety of different communication protocols. In some other embodiments, the network includes Bluetooth communication networks or a cellular communications network for sending and receiving data including via short messaging service (SMS), multimedia messaging service (MMS), hypertext transfer protocol (HTTP), direct data connection, WAP, email, etc. In addition, although the figures illustrate a single network coupled to the playground structures or such elements; in practice one or more networks may be connected to these entities.

In some embodiments of the network architecture, one or more control units may be configured to manage or control operations of the playground structures or components, as they are widely distributed and located across the globe. A control unit may be configured to control these playground structures, by region, or by other criteria, for example telecommunication carrier collaborations. As illustrated, the control unit is coupled to the playground structures through a network. The control unit may be a hardware server including a processor, a memory and network communication capabilities. The control unit is communicatively coupled to the network, via a bi-directional signal line. In some embodiments, the control unit server sends and receives data to and from one or more of the playground structures or components, via the network. The control unit server may track playground structures that are active. In some embodiments, the control unit may include additional tools such as an image editing tool, a 3D Imaging tool, a coding tool, and a component-collaboration tool.

In some embodiments, the image editing tool provides editing tools that enable a user to modify a 2-D image, e.g., a digital photograph image. Typical editing tools include a selection tool for selecting a region or object in the image, a copy tool to copy selected objects, a paste tool to paste an object copied from the image or an external object (e.g., an object copied from another image source) into the image, and image modification tools that enable the user to change the color, shape, size, or proportion of a selected object. Editing tools for 2-D images operate in the plane of the image because the image editing applications operate on the assumption that the image is coplanar to the camera's focal plane. However, the image may contain elements that are 2-D representations of three-dimensional (3-D) objects and have a perspective that affects their appearance based on their distance from the camera. The editing tools do not account for the perspective, which can make regions of the image having perspective challenging to edit. The image editing tool also provides techniques to provide a perspective editing tool for performing edits in regions of an image having perspective. The perspective editing tool enables the user to identify one or more regions in a 2-D image having perspective, i.e., perspective areas. The user can perform various editing operations on an object such that the edited object conforms to the perspective of the perspective area. The 3D imaging tool 114a may include photo-editing software that allows users to create 3D manipulations to illuminate the hidden areas of an image. The coding tool may include various coding mechanisms known to those skilled in the art to implement and execute additional functionalities and a portals collaboration tool may include interfaces for various users to collaborate and meet in virtual forums.

The playground structures include a transmitter/receiver, in communication with a camera, a microphone, a projector, a display screen, a speaker, a capture image unit, a capture audio unit, a module that projects images and transmits audio of the user received at location B. The playground structure at location B includes similar components to accomplish the same functionalities and operations at location B. The playground structure includes a Transmitter/Receiver coupled and in communication with a camera, a microphone, a projector, a display screen, a speaker, a capture image unit, a capture audio unit, a module that projects image and transmits audio of the user received at location B. The person within the playground structure at location B views the figure from location A, as both stand face-to-face sharing an immersive experience, as if in the same room engaged in conversation. The communications are transmitted via a network. In operation, the camera at one location (in a playground structure), located behind the flat screen (display screen) captures image data of the child at that location via a tiny hole in the flat screen (display screen), and transmits that image data to a receiver. The image data is projected by the projector at another location on the flat screen (display screen) so the observing child (at the other end) views the child (at the first location), experiencing the sensation that she is in the same room as him. The camera behind the flat screen (display screen) in the second location, via the tiny hole captures image data of the child there and transmits the image data via the transmitter to the receiver at the first location and that image data is projected by the projector on the flat screen of the playground structure for the child at the first location to see. The microphones and at either end with the speakers and, capture the audio (by audio capture units). In some embodiments, the children are positioned to accomplish best effects, in some instances they may be located anywhere between 5-20 feet from the flat screen.

In some embodiments, the structures may be immersive playground structures configured to provide pre-recorded encounters with others. In such instances, a child may be represented by pre-recorded images. In some embodiment the display screens, either may be used a video wall to display the channels implementations or projections of landscape or scenes for viewing by those facing the screen. The playground structures in these instances may be configured to provide a venue for an audience. In some examples, the video walls for channels may be used on the side of buildings. These may be LCD screens configured to broadcast live feeds from another area that is continuous.

A central controller (comprising computers and processors in a distributed architecture, e.g. control units described above) may be located at key locations in the world and may be configured to automatically determine when the playground structures are active (i.e., set up and operational). In some implementations, upon determining that playground structures are active, audio-video communication requests by others to users at the playground may be routed or messages conveyed to them. The central controller or control unit may inform or convey messages of general interest via the playground structures (news feed etc.). The central controller or control unit may facilitate myriad other telecommunication features.

The main objectives of the "immersive" experience that are provided to those using the playground structures, is that both figures on either side of the communication channel maintain eye contact and see the full body (e.g., as a result of a full body image capture) of the child or children in the other playground structure. In addition, in the playground structure, minimal distortion from the curvature of the lens is captured, by using a small lens that is minimally distracting to the viewer, and efficient in image capture, to prevent unnecessary capture of pixel data that has to be cropped out later. In some embodiments, to accomplish these objectives, the playground structure may place a camera in a fixed location, thereby using a flat focal plane to create a 2D image of a child within a context of the rear of the playground structure, which is then projected onto a flat screen. It should be recognized that three fundamental optics principles come into play here, namely, 1) perspective, and the attendant perspective distortion, 2) relative illumination, and 3) f-theta distortion.

To ensure eye contact, in some embodiments the camera is placed close to eye level—roughly five and a half feet. At this height, to capture the full body and not capture excess material, particularly of the ceiling, the camera is tilted downward. In addition, the camera lens must have a wide enough field of view for the whole human body to be acquired within a relatively short distance. Tilting the camera down causes perspective distortion, namely the compression of the lower parts of the persons' body. The object's legs shrink, as a result of which the object image appears "squat." This presents a distorted perspective of the image. This distortion may be addressed and corrected by software techniques, but this often results in a lag in transmission, which is hardly desirable. Alternatively, it is possible to "keystone" the outputting projector, but this severely degrades the quality of the projected image, as this approach stretches the pixels. Also, the lens itself may be adjusted. This minimizes lag and maximizes quality of output. Further additional challenges that must be noted are perspective distortion and relative illumination and F-theta distortion, which are less critical, but can be resolved by further customizing the lens solution.

The image exhibits significant keystone distortion, and her legs appear shortened while her head is enlarged. Horizontal features in the image are distorted, and there is significant falloff in brightness versus field. While it is well enough resolved, it does not appear realistic enough to create the illusion of a person in the same room. In addition, the camera array itself is wider than it is tall. To correct this imperfection, the camera configuration flips the camera sideways to estimate an aspect ratio of what may privilege height. In a conventional 4:3 horizontal format lens, this means only 40% or so of the useable field of view is actually displayed. This may be improved to 80% or so by using an HD format 16:9 camera on its side, but this is still relatively inefficient. One simple approach to removing the perspective distortion is to use a camera lens, which is designed for an even wider field of view, placed horizontally at eye level, and to shift the camera with respect to the lens to correct perspective. In order to utilize the format of the camera more effectively, the camera configuration rotates the camera 90 degrees, so the wider dimension of the camera is along the vertical axis, where the image is longer. A wide angle lens in this configuration is shown in FIG. 8, and the resultant image is shown in FIG. 8. The portal structure corrects the perspective distortion, and much more of the sensor is used, yet the image exhibits significant f-theta distortion. This is largely because lenses able to capture such wide angles tend to have 5% or more f-theta distortion as a result of the extremely wide range of angles, which must be accommodated.

This image is further improved, by using a wide field projection lens instead of a simple wide angle. Such lenses are designed to minimize distortion. An optical schematic of this kind of lens is shown in FIG. 8 and the resultant image 814 is shown in FIG. 8. The distortion is reduced by a factor of two, and the relative illumination is almost completely uniform. The disadvantage to using a projection lens like this is that they tend to be very large. A large lens is distracting to the observer and therefore undesirable. In some embodiments, a custom lens design is used for this specific application. The custom lens is small, has proper relative illumination and minimum distortion.

This camera configuration with this custom lens improves the image, by limiting the field of view required for the lens, by both tilting the lens and the detector downward, but allowing the lens groups to tilt and decenter with respect to each other as well. This flattens the field and results in more favorable distortion at the bottom of the field and less at the top.

Reference in the specification to "some embodiments" or "an embodiment" means that a particular feature, structure, or characteristic described in connection with the embodiment is included in at least some instances of the description. The appearances of the phrase "in some embodiments" in various places in the specification are not necessarily all referring to the same embodiment.

Some portions of the detailed description are presented in terms of algorithms and symbolic representations of operations to be performed by the components of the system described, either on data bits within a computer memory of the components or otherwise. These algorithmic descriptions and representations are the means used by those skilled in the data processing and telecommunications arts to most effectively convey the substance of their work to others skilled in the art. An algorithm is here, and generally, conceived to be a self-consistent sequence of steps leading to a desired result. The steps are those requiring physical manipulations of physical quantities or components. Usually, though not necessarily, these quantities (within the electrical or optical components) may take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system or computerized component, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may include a general-purpose computer or electrical or optical component selectively activated or reconfigured by a computer program stored in the computer or instructions in a controller. Such a computer program may be stored in a computer readable storage medium, such as, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Certain components described in the specification may take the form of an entirely hardware embodiment, an entirely software embodiment, or embodiments containing both hardware and software elements. In some embodiments, these components described in the specification may be implemented in software, which includes but is not limited to firmware, resident software, microcode, etc.

Furthermore, the description of such components may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, remote printers, social network data stores, or other venues, through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the parts of the specification are not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense and the invention is to be considered limited solely by the scope of the appended claims.

What is claimed is:

1. A shared system for play, comprising:
    an audio-visual playground structure including a first display screen placed in a first remote location and a second display screen placed in a second remote location, said first display screen and said second display screen coupled by a communication link, said first display screen and said second display screen including a camera to capture and continuously transmit life-size images from said first display screen to said second display screen and from said second display screen to said first display screen, said first display screen and said second display screen configured to broadcast a live feed of captured images from one end of said communication link to another end of said communication link;
    a mechanical mechanism within said audio-visual playground structure and configured to be operated by a control unit and a plurality of devices at each of said first and second remote locations, said plurality of devices transmitting particular data to said control unit; and an audio interface linked to said first display screen and said second display screen and configured to transmit audio communication over said communication link said audio interface coupled to at least said first display screen to accomplish audio communication; said audio interface further comprising:
- an analog-to-digital converter coupled to said audio interface to receive a first vocal signal conveying real-time conversation between two humans at opposite ends of said communication link;
- a second environmental signal conveying ambient sounds detected in a surrounding environment;
- an echo-cancellation algorithm applied to the first vocal signal and the second environmental signal received from the analog-to-digital converter;
- a dynamic mixing algorithm for combining the first vocal signal and the second environmental signal to balance a ratio of the first vocal signal to the second environmental signal; and
- a compressor and limiter that transmits the first vocal signal and the second environmental signal over the communication link.

2. The shared system for play according to claim 1, wherein said audio interface further comprises: a first microphone coupled to said first display screen and a second microphone coupled to said second display screen for said audio communication.

3. The shared system for play according to claim 1, wherein said audio interface further comprises:
a first speaker coupled to said first display screen and a second speaker coupled to said second display screen.

4. The shared system for play according to claim 1, further comprising:
- a transmitter for transmitting said captured images and said audio communication from one end of said communication link to another end of said communication link; and
- a receiver for receiving said captured images and audio communication from said one end of said communication link to said another end of said communication link.

5. The shared system for play according to claim 1, wherein the camera is sized to appear unobtrusive in the display screens.

6. The shared system for play according to claim 1, wherein a child is positioned facing each of the first and second display screens.

7. The shared system for play according to claim 1, wherein each of the first display screen and the second display screen is a LCD screen.

8. The shared system for play according to claim 1, wherein the audio interface further comprises:
a speaker and microphone coupled to the first display screen and the second display screen to accomplish audio communication.

9. The shared system for play according to claim 1, wherein the plurality of devices includes a sensor and a haptics device.

10. The shared system for play according to claim 1, further comprising:
a plurality of display screens including the first display screen and the second display screen, arranged in an assembly to create a digital canvas configured to expand at the one end of the communication link.

11. A shared system for interactive play, comprising:
a plurality of display screens arranged in an assembly to create a digital canvas configured to expand at one end of a communication link, wherein the digital canvas is provided within an audio-visual structural playground, the digital canvas comprising a first display screen from the plurality of display screens placed in a first remote location and coupled to a second display screen from the plurality of display screens in a second remote location by the communication link, each of the first display screen and the second display screen, including a camera to capture and continuously transmit life-size images from the first display screen to the second display screen and from the second display screen to the first display screen, the first display screen and the second display screen configured to broadcast a live feed of captured images from the one end of the communication link to another end of the communication link;
a mechanical mechanism within the audio-visual playground structure operable by a control unit and a plurality of devices at the remote locations, the plurality of devices transmitting particular data to the control unit; and
an audio interface linked to the first display screen and the second display screen and configured to transmit audio communication over the communication link.

12. The shared system for interactive play according to claim 11, wherein the audio interface further comprises: a first microphone coupled to the first display screen and a second microphone coupled to the second display screen for the audio communication.

13. The shared system for interactive play according to claim 11, wherein the audio interface further comprises:
a first speaker coupled to the first display screen and a second speaker coupled to the second display screen.

14. The shared system for interactive play according to claim 11, further comprising:
- a transmitter for transmitting captured images and the audio communication from one end of the communication link to another end of the communication link; and
- a receiver for receiving the captured images and audio communication from the one end of the communication link to the other end of the communication link.

15. The shared system for interactive play according to claim 11, wherein the camera is sized to appear unobtrusive in the display screens.

16. The shared system for interactive play according to claim 11, wherein a child is positioned facing each of the first and second display screens.

17. The shared system for interactive play according to claim 11, wherein each of the first display screen and the second display screen is a LCD screen.

18. The shared system for interactive play according to claim 11, wherein the audio interface is coupled to the first display screen and the second display screen to accomplish audio communication, and the audio interface further comprises:
- an analog-to-digital converter coupled to the audio interface to receive a first vocal signal conveying real-time conversation between two humans at opposite ends of the communication link;
- a second environmental signal conveying ambient sounds detected in the surrounding environment;

an echo-cancellation algorithm applied to the first vocal signal and the second environmental signal received from the analog-to-digital converter;

a dynamic mixing algorithm for combining the first vocal signal and the second environmental signal to balance the ratio of the first vocal signal to the second environmental signal; and a compressor and limiter that transmits the first vocal signal and the second environmental signal over the communication link.

19. A method for providing interactive play via a shared system, comprising:

providing an audio-visual playground structure including a first display screen placed in a first remote location and a second display screen placed in a second remote location, by coupling the first display screen and the second display screen by a communication link, wherein the first display screen and the second display screen include a camera;

capturing, with the camera, and continuously transmitting life-size images from the first display screen to the second display screen and from the second display screen to the first display screen, the first display screen and the second display screen configured to broadcast a live feed of captured images from one end of the communication link to another end of the communication link;

providing a mechanical mechanism within the audio-visual playground structure operable by a control unit and a plurality of devices at each of the first and second remote locations, wherein the plurality of devices transmit particular data to the control unit; and linking an audio interface to the first display screen and the second display screen operable to transmit audio communication over the communication link, the audio interface coupled to the first display screen and the second display screen to accomplish audio communication, wherein the audio interface further comprises an analog-to-digital converter coupled to the audio interface to receive a first vocal signal conveying real-time conversation between two humans at opposite ends of said communication link and a second environmental signal conveying ambient sounds detected in a surrounding environment;

applying an echo-cancellation algorithm to the first vocal signal and the second environmental signal received from the analog-to-digital converter and a dynamic mixing algorithm for combining the first vocal signal and the second environmental signal to balance a ratio of the first vocal signal to the second environmental signal; and using a compressor and limiter that transmits the first vocal signal and the second environmental signal over the communication link.

20. The method according to claim 19, further comprising:

transmitting, using a transmitter, the captured images and the audio communication from one end of the communication link to another end of the communication link; and receiving, using a receiver, the captured images and audio communication from the one end of the communication link to the other end of the communication link.

* * * * *